(12) United States Patent
Harvey

(10) Patent No.: US 11,736,545 B2
(45) Date of Patent: Aug. 22, 2023

(54) CLIENT USER INTERFACE FOR VIRTUAL FAN EXPERIENCE

(71) Applicant: Famous Group Technologies Inc., Culver City, CA (US)

(72) Inventor: Gregory Lawrence Harvey, Hermosa Beach, CA (US)

(73) Assignee: Famous Group Technologies Inc., El Segundo, CA (US)

( * ) Notice: Subject to any disclaimer, the term of this patent is extended or adjusted under 35 U.S.C. 154(b) by 0 days.

(21) Appl. No.: 17/502,569

(22) Filed: Oct. 15, 2021

(65) Prior Publication Data

US 2022/0124132 A1 Apr. 21, 2022

Related U.S. Application Data

(60) Provisional application No. 63/093,146, filed on Oct. 16, 2020, provisional application No. 63/093,147, filed on Oct. 16, 2020, provisional application No. 63/093,145, filed on Oct. 16, 2020, provisional application No. 63/093,144, filed on Oct. 16, 2020.

(51) Int. Cl.
*H04L 65/611* (2022.01)
*H04L 65/1076* (2022.01)
*H04L 65/401* (2022.01)

(52) U.S. Cl.
CPC ........ *H04L 65/611* (2022.05); *H04L 65/1076* (2013.01); *H04L 65/401* (2022.05)

(58) Field of Classification Search
CPC ... H04L 65/611; H04L 65/1076; H04L 65/401
See application file for complete search history.

(56) References Cited

U.S. PATENT DOCUMENTS

| 6,807,563 | B1* | 10/2004 | Christofferson | H04L 9/40 |
| | | | | 709/204 |
| 8,727,892 | B1* | 5/2014 | Chun | G07F 17/3225 |
| | | | | 463/40 |
| 9,723,242 | B1* | 8/2017 | Fulay | H04N 21/47 |
| 10,469,546 | B2* | 11/2019 | Miller | G06F 3/016 |
| 2002/0126226 | A1* | 9/2002 | Dudkowski | G11B 27/034 |
| | | | | 348/588 |
| 2002/0133247 | A1* | 9/2002 | Smith | H04N 21/23424 |
| | | | | 370/360 |

(Continued)

*Primary Examiner* — Javier O Guzman
(74) *Attorney, Agent, or Firm* — Schwegman, Lundberg & Woessner, P.A.

(57) ABSTRACT

A method of providing a user interface for a live virtual fan experience on a client device of a user is disclosed. Based on a receiving of a notification from a live event broadcasting platform, a live video feed of the user is communicated to the live event broadcasting platform. Based on a receiving of a notification from the live event broadcasting platform that the live video feed of the user has been selected for integration into a broadcasting of the live event, a notification is caused to be presented in real time in the user interface. Based on a notification from the live event broadcasting platform that the live video feed of the user has been integrated into the broadcasting of the live event, the user interface is caused to be updated in real time to reflect the integrating of the live video feed.

20 Claims, 30 Drawing Sheets
(17 of 30 Drawing Sheet(s) Filed in Color)

(56) References Cited

U.S. PATENT DOCUMENTS

| | | | |
|---|---|---|---|
| 2003/0069789 A1* | 4/2003 | Gathman | G06Q 30/02 705/14.64 |
| 2007/0204294 A1* | 8/2007 | Walker | H04N 7/162 725/38 |
| 2010/0175004 A1* | 7/2010 | Deep | H04L 12/1818 709/204 |
| 2011/0161485 A1* | 6/2011 | George | H04L 43/16 709/224 |
| 2012/0226997 A1* | 9/2012 | Pang | H04L 12/1818 715/753 |
| 2013/0054690 A1* | 2/2013 | Wei | G06Q 10/109 709/204 |
| 2013/0132604 A1* | 5/2013 | Cohen | H04W 76/15 709/231 |
| 2013/0198654 A1* | 8/2013 | Jones | H04L 65/403 715/753 |
| 2014/0269401 A1* | 9/2014 | Gondi | H04L 65/70 370/253 |
| 2014/0320662 A1* | 10/2014 | McNamee | H04N 5/247 348/159 |
| 2016/0323333 A1* | 11/2016 | Aggarwal | H04L 65/4038 |
| 2016/0381109 A1* | 12/2016 | Barnett | G06Q 10/10 709/231 |
| 2016/0381111 A1* | 12/2016 | Barnett | H04N 21/42203 709/231 |
| 2017/0357391 A1* | 12/2017 | Galfond | G07F 17/3288 |
| 2018/0098073 A1* | 4/2018 | Lawrence | H04N 19/597 |
| 2018/0158000 A1* | 6/2018 | Fredette | G06Q 30/0601 |
| 2018/0352303 A1* | 12/2018 | Siddique | H04L 65/80 |
| 2018/0375676 A1* | 12/2018 | Bader-Natal | G06F 3/0481 |
| 2019/0102941 A1* | 4/2019 | Khan | G06T 19/006 |
| 2019/0342583 A1* | 11/2019 | Gatch, III | H04N 21/25866 |
| 2019/0379712 A1* | 12/2019 | Mota | H04L 65/1089 |
| 2020/0267427 A1* | 8/2020 | Rogers | H04N 21/233 |
| 2020/0396266 A1* | 12/2020 | Goel | H04L 65/1066 |
| 2021/0314525 A1* | 10/2021 | Raduchel | H04L 65/4053 |

* cited by examiner

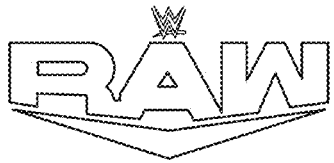

THANK YOU FOR REGISTERING FOR RAW ON
8/24/2020

DOES THIS MEAN I'M IN?
WE WILL SEND YOU AN EMAIL WITH THE LINK TO JOIN ON THE DAY OF THE SHOW. SEATS ARE AVAILABLE ON A FIRST-COME, FIRST-SERVED BASIS UNTIL SEATS FILL UP. ONCE YOU'RE IN THE WWE THUNDERDOME, YOU WILL JOIN OTHER FANS WHO WILL APPEAR LIVE ON DIGITAL VIDEO BOARDS DURING THE SHOW.

CALL TIME
7:00PM ET 8/24/2020

VIRTUAL SHOW LINK
LOOK OUT FOR ANOTHER EMAIL WITH THE LINK TO JOIN ON THE DAY OF THE SHOW.
THIS LINK IS PERSONAL TO YOU. IT IS VALID ONE TIME ONLY AND CAN ONLY BE CLICKED ON ONCE. DO NOT SHARE YOUR LINK.

GUIDELINES
ALL REGISTERED FANS ARE FURTHER SELECTED ON A FIRST-COME, FIRST-SERVED BASIS. PLEASE MAKE SURE YOU ARE CAMERA READY. REMEMBER, YOU WILL BE APPEARING ON A LIVE SHOW. WE RESERVE THE RIGHT TO REMOVE YOU FROM THE LIVE STREAM AT ANY TIME, FOR ANY REASON. THE AUDIENCE WILL BE REFRESHED THROUGHOUT THE NIGHT AND YOU MAY NOT BE INCLUDED IN THE ENTIRE BROADCAST. IN ADDITION, WE MAY REMOVE YOU FROM THE LIVE STREAM FOR ANY INAPPROPRIATE CONDUCT OR TECHNICAL ISSUES. WATCH THE SHOW THROUGH THE STREAM ON YOUR DEVICE. POSITION YOURSELF IN FRONT OF YOUR CAMERA FROM YOUR MIDSECTION UP, LEAVING A LITTLE ROOM ABOVE YOUR HEAD. MAKE SURE YOU HAVE GOOD LIGHTING. ONLY ONE FAN PERMITTED PER SEAT. YOUR ATTIRE MUST BE APPROPRIATE AND MUST REMAIN ON AT ALL TIMES. OFFICIALLY LICENSED WWE CLOTHING IS PREFERRED, IF AVAILABLE. WE RESERVE THE RIGHT TO TERMINATE YOUR PARTICIPATION AT OUR SOLE DISCRETION IF YOUR ATTIRE CONTAINS ANY IMMORAL GRAPHICS, IMAGES OR TEXT, ANY POLITICAL STATEMENTS, SLOGANS, LOGOS, GRAPHICS OR OTHER COMMERCIAL IDENTIFICATION OF THIRD-PARTIES OTHER THAN THE WWE, ITS ATHLETES AND SPONSORS.

PLEASE DO NOT REPLY TO THIS EMAIL. THIS EMAIL WAS SENT FROM A NOTIFICATION-ONLY EMAIL ADDRESS THAT CANNOT ACCEPT INCOMING MAIL.

*FIG. 15*

CLIENT USER INTERFACE FOR VIRTUAL FAN EXPERIENCE

CROSS-REFERENCE TO RELATED APPLICATION

This patent application claims the benefit of U.S. Provisional Patent Application No. 63/093,146, filed Oct. 16, 2020; U.S. Provisional Patent Application No. 63/093,144, filed Oct. 16, 2020; U.S. Provisional Patent Application No. 63/093,147, filed Oct. 16, 2020; and U.S. Provisional Patent Application No. 63/093,145, filed Oct. 16, 2020, which are incorporated by reference herein in their entirety.

TECHNICAL FIELD

The present disclosure generally relates to video broadcasting platforms and, in one specific example, to a video broadcasting platform configured to integrate, in real time, broadcasting of a live event with a virtual fan experience.

BACKGROUND

The Covid-19 global pandemic has resulted in a reduction in fans willing or able to attend live events, such as live concerts and live sporting events. This change has highlighted some technical challenges in video broadcasting of live events, including how best to bring the energy of fans, many of whom may be watching a live event remotely, into a venue in which the live event is occurring (e.g., such that both the talent in the venue and the viewers at home can feel the energy or interplay between them).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 15 depicts an example user interface for a confirmation message after a successful registration for a virtual seat at a live event.

DETAILED DESCRIPTION

Figure 1:
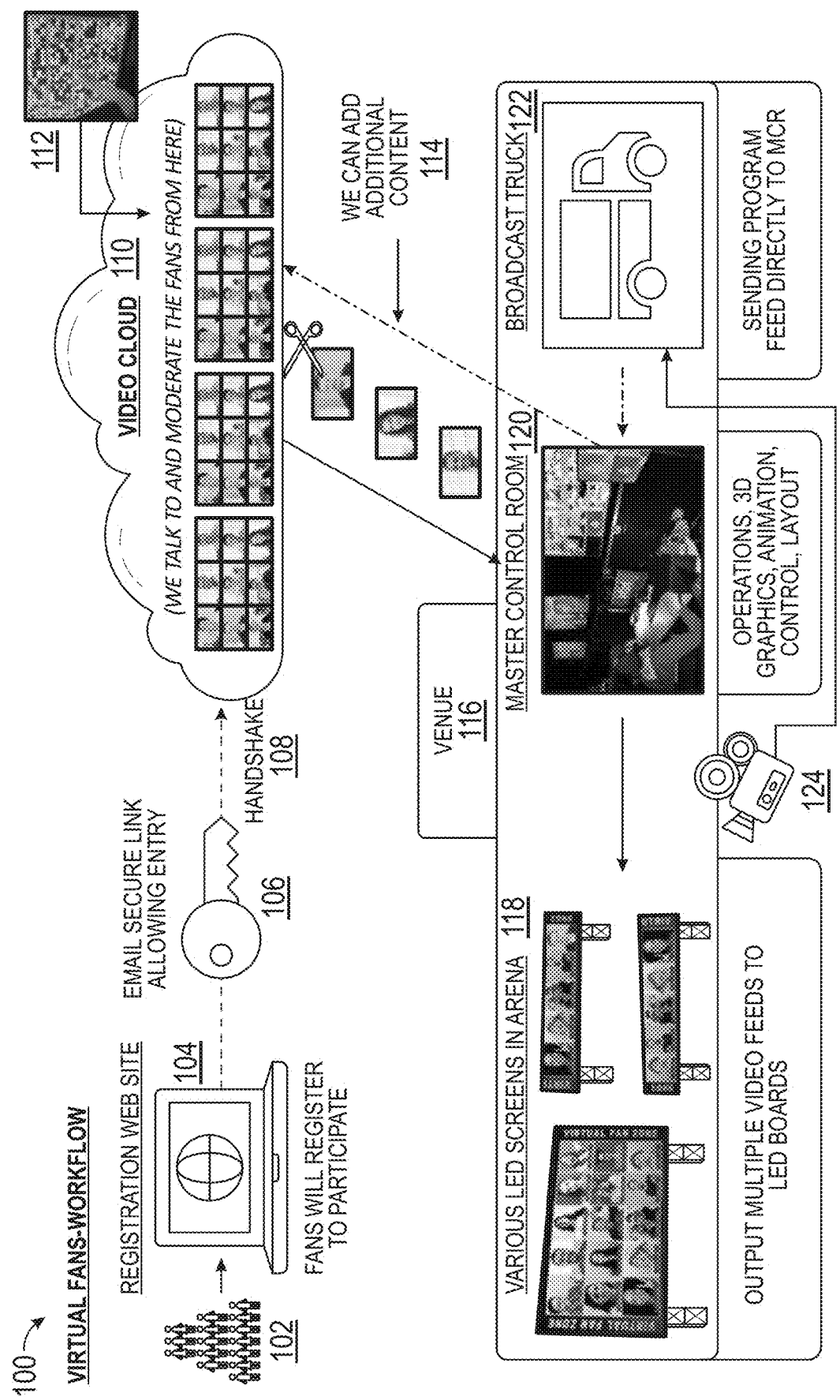
FIG. 1 is a block diagram depicting an example system for implementing the methods and operations disclosed herein.

In the following description, for purposes of explanation, numerous specific details are set forth in order to provide an understanding of example embodiments of the present subject matter. It will be evident, however, to those skilled in the art that example embodiments may be practiced without these specific details.

In example embodiments, a method is disclosed for presenting a user interface for a live virtual fan experience on a client device of a user. In example embodiments, based on a detection that the client device has successfully registered for and been granted access to the live virtual fan experience, one or more client applications executing on the client device cause a live video and/or audio feed of the user to be communicated to the live event broadcasting platform in real time. The one or more client applications may cause the live video and/or audio feed to be captured from a video camera and/or a microphone connected to the client device. Based on a determination that the live video and/or audio feed of the user has been selected for integration into a broadcasting of the live event, one or more user interfaces presented by the one or more client applications are updated in real time to reflect the selecting of the video and/or audio feed. Based on a determination that the live video and/or audio feed of the user has been integrated into the broadcasting of the live event, the one or more user interfaces are updated in real time to reflect the integrating of the live video and/or audio feed of the user into the broadcasting of the live event. Based on a determination that the live video and/or audio feed of the user has been removed from the broadcasting of the live event, the one or more user interfaces are updated in real time to reflect the removing of the live video and/or audio feed of the user from the broadcasting of the live event.

In example embodiments, a method is disclosed for managing integration of a broadcasting of a live event with a live virtual fan experience in real time. A plurality of live video feeds is received from a live event platform. The plurality of video feeds is associated with a plurality of devices associated with a plurality of users. One or more user interfaces are caused to be displayed on one or more display screens associated with an administration system. The one or more user interfaces include a first portion and a second portion. The first portion includes a first set of groups of the plurality of live video feeds. The first set of groups corresponds to subsets of the plurality of live video feeds that have been selected for including on one or more display screens set up within a venue of the live event. The second portion includes a second set of groups. The second set of groups corresponds to subsets of the plurality of live video feeds that have been curated for including in one or more prominent locations on the one or more display screens set up within the venue. Based on a selection of one of the live video feeds in the first set of groups, the selection is moved from the first set of groups to one of the second set of groups. The movement is reflected in real time on the one or more display screens.

In example embodiments, a method of managing integration of a broadcasting of a live event with a live virtual fan experience in real time is disclosed. A plurality of live video feeds is received from a plurality of devices associated with a plurality of users. One or more user interfaces are caused to be displayed on one or more display screens associated with an administration system. The one or more user interfaces include a portion depicting mappings of a subset of the plurality of live video feeds to locations in which the subset of the plurality of live video feeds is being displayed on one or more display screens set up within a venue of the live event. Based on output received from the administration system indicating a changing of one of the mappings, the changing is caused to be reflected in real time on the one or more display screens set up within the venue of the live event.

In example embodiments, a method is disclosed for integrating a live virtual fan experience into a broadcasting of a live event. A plurality of live video feeds is received. A plurality of data items is received. The plurality of data items specifies mappings of the plurality of live video feeds to locations in a virtual fan seating area in the venue of the event. The plurality of live video feeds is caused to be presented at the locations in the virtual fan seating area in in real time during a broadcasting of the live event. The causing of the live video feeds to be presented includes routing the live video feeds to audio and/or visual inputs of one or more displays of a virtual fan venue system used to implement the virtual fan seating area. A change to the plurality of live feeds or a change to the plurality of data items is received. The change is caused to be reflected in the virtual seating fan seating area in real time during the broadcasting of the event.

In example embodiments, a method is disclosed for moderating a live virtual fan experience that is being integrated into a broadcasting of a live event in real time. Based on a determination that a video feed of a plurality of live video feeds being displayed on one or more display screens set up within a venue of the live event has violated a policy, removing the video feed, replacing the video feed with an additional video feed, or obfuscating the video feed on the one or more display screens in real time during the broadcasting. Based on a determination that the video feed is no longer violating the policy, restoring the video feed, replacing the additional video feed with the video feed, or removing the obfuscating the video feed in real time during the broadcasting.

FIG. 1 is a block diagram depicting an example system 100 for implementing the methods and operations disclosed herein.

One or more users 102 access video cloud 110 in a secure fashion (e.g., using a secure link 106 and completing a handshake 108) using more client device(s) 104. The client devices 104 are configured to be connected through one or more network(s) to a live event platform executing in the video cloud 110. In example embodiments, the live event platform includes a set of services for integrating a virtual fan experience into a broadcasting of a live event, as described herein. In example embodiments, the live event platform software services are hosted on a software-as-a-service (SaaS) layer or platform. The SaaS platform may be part of a service-oriented architecture, being stacked upon a platform-as-a-service (PaaS) layer which, may be, in turn, stacked upon a infrastructure-as-a-service (IaaS) layer (e.g., in accordance with standards defined by the National Institute of Standards and Technology (NIST)).

The set of services includes one or more services configured to, for example, manage registrations of client devices to access the virtual fan experience in real time (e.g., during a broadcasting of a live event); manage reception and transmission of live video and/or audio feeds in real time between the live event platform and the one or more client devices 104, one or more video cloud administration system(s) 112 configured to, for example, select videos from the video cloud for sending to a master control room 120, one or more virtual fan venue systems 118, and one or more broadcasting system(s) 122; manage presentations of one or more fan experience user interface(s) in one or more client application(s) executing on the one or more client devices 102, manage administration of an integration of the live video and/or audio feeds received from the one or more client devices 102 with the one or more virtual fan venue systems in real time (e.g., including implementing commands received from one or more administration application(s) executing on one or more administration system(s) associated with the master control room 120 and/or using machine-learning models), manage real-time additions of content 114 to the video streams (e.g. 3D graphics and animations, manage real-time control layout of content on the virtual fan venue systems 118, and manage routing of selected live video/or audio feeds to the one or more virtual fan venue systems 118 (e.g., to designated locations on one or more displays set up within a venue of the live event, as described in more detail below). In example embodiments, some functions associated with the master control room systems 120, broadcasting systems 122, and the virtual fan venue system 118 may be located al a same venue 116 (e.g., outside of the video cloud 110) (e.g., in order to improve performance of the systems). Here, the term "real-time" is meant to include a response within milliseconds or microseconds, such as a response that is guaranteed by the system 100 to be within a specified deadline relative to an event. Thus, for example, the presentation of live video feeds in the venue, as well as any additions or modifications of those feeds, occur without significant delay and sufficiently quickly to affect the environment during a broadcasting of a live event, such that, for example, with a specified amount of tolerance, reactions of virtual fans to an occurrence within the live event are in synchronization with the time of the occurrence. Because the system is built on a cloud architecture and utilizes modular components at the venue 116, the system is easily scalable to support integrating of just a small group of video feeds of virtual fans to tens of thousands of video feeds or more into one or more virtual fan venue systems at the venue. In example embodiments, the venue is a physical venue, such as an arena, stadium, or concert hall. In example embodiments, the venue is a virtual venue, such as in a user interface of associated with a computer application, such as a computer video game. In example embodiments, the live video feeds may be routed to one or more physical displays set up in a physical venue, such as wrestling arena or basketball court, or the live video feeds may be routed to a video server for displaying in conjunction with a virtual event, such as a live video game championship. In example embodiments, the venue may include a combination of a physical venue and a virtual venue, such that, for example, some virtual fans appear on displays set up within a physical venue, and others are inserted into a video feed of a broadcasting of the physical event, such as in a graphical overlay or a graphical user interface.

Figure 2:
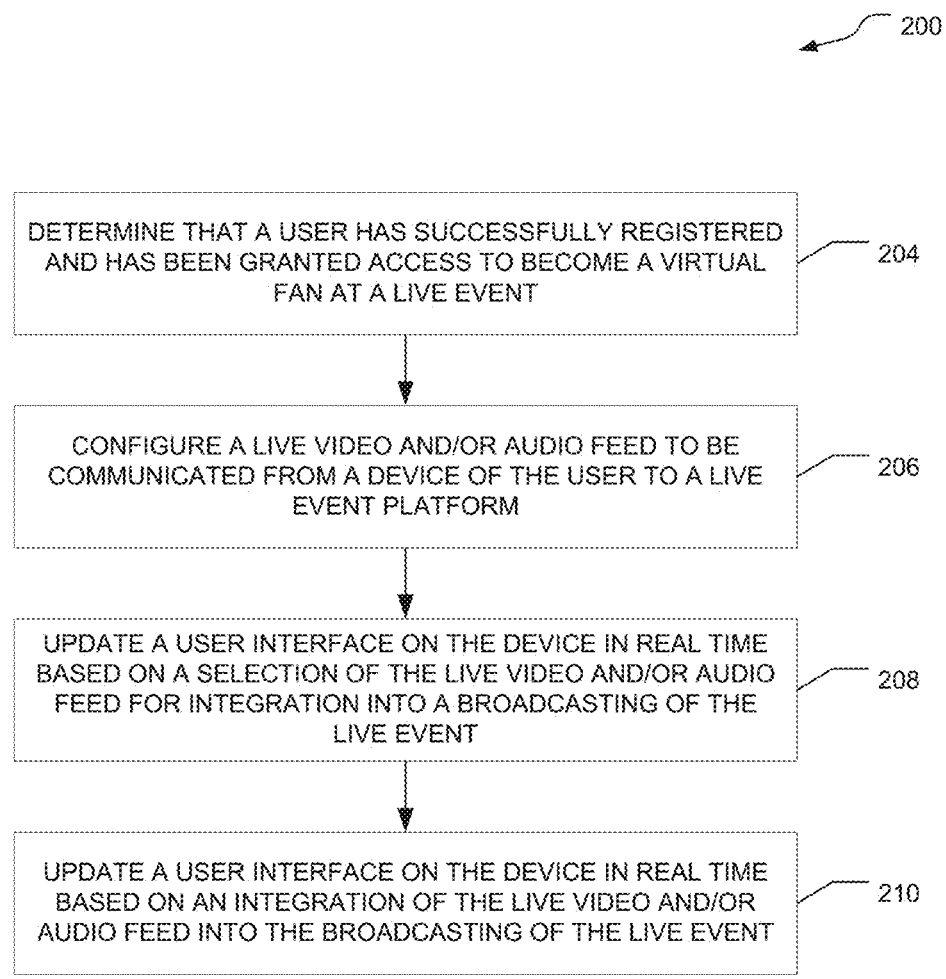
FIG. 2 is an example of a method for implementing one or more user interfaces associated with a live virtual fan experience on a client device of a user

FIG. 2 is an example of a method 200 for implementing one or more user interfaces associated with a live virtual fan experience on a client device of a user. In various embodiments, the user interface may be provided by the live event platform 110 and/or executed on the client device(s) 102 (e.g., as a web application or a client-server application).

At operation 204, it is determined that the user successfully registered for a virtual seat for the live event. In example embodiments, the registration form may have been provided to the user in the one or more user interfaces based on an activation of a link on a social media platform, such as Twitter (see, e.g., FIG. 14). In example embodiments, successfully completing the registration form via the one or more user interfaces may require the user to provide various information for transmitting to the live event platform, such as the user's first name, last name, and email address. In example embodiments, the data input into the registration form by the user via the one or more user interfaces may be validated (e.g., as being of a proper for) before the registration flow presented in the one or more user interfaces continues.

During the registration flow, the user may be provided with terms and conditions associated with participation by the user as a virtual fan in the live event. For example, the user may be prompted to verify that the user is of an appropriate age for participating in the live event, such as an age that conforms with any legal requirements associated with participation in the live event (e.g., 18 years old or over).

In example embodiments, the user may be prompted to agree to appear on his or her screen during the live event. In example embodiments, the user may be prompted to agree that any absence from the screen may result in the user's virtual seat being reassigned to a replacement participant or otherwise discontinued. In example embodiments, the user may be prompted to agree that the live event platform reserves the right to not allow the user to participate or to immediately terminate the user's participation at any time for no reason or for any reason, including if the user's behavior is inappropriate or violates any other policy.

In example embodiments, upon successful registration and agreement the terms and conditions, the user may be provided a custom virtual show link that is specific to the user. In example embodiments, the user may be prompted to agree to not share, forward, or otherwise disclose the link to anyone else. In example embodiments, the user may be prompted to agree that no one other than the user will appear on the user's screen or participate in the live event and that no unauthorized people will be allowed on the camera.

In example embodiments, the user may be required to enter an electronic signature to accept the terms and conditions. In example embodiments, the registration may be accepted only after the user's electronic signature is verified as being of a proper form. In example embodiments, a security measure, such as CAPTCHA, may be integrated into the user interface to deter bots from successfully completing the registration.

In example embodiments, the user's registration may be rejected under certain circumstances, such as if a predetermined number of virtual fan seats have already been claimed or a registration time period has closed. In example embodiments, upon successfully completing the registration process via the one or more user interfaces, the user may be notified that a confirmation will be provided to the user (e.g., via the one or more user interfaces or an out-of-band channel provided by the user during the registration process, such as an email channel or an instant messaging channel) for further instructions on how the user can claim the virtual seat.

In example embodiments, the administration of various registration options, such as the maximum number of registrants and the registration period, are controlled via a user interface presented to an administration on the one or more administration systems 112. In example embodiments, the registration options include geotargeting options, including specifying a percentage of users from a particular geographical region who are eligible to receive virtual tickets. Thus, for example, an administrator could specify that 80% of the virtual tickets are allocated for U.S. residents and that the remaining 20% of the virtual tickets are to be allocated to non-U.S. residents.

In example embodiments, the user may receive the confirmation of the registration (e.g., via the one or more user interfaces or the out-of-band channel, such as via an email message sent to an email account of the user). The confirmation may include a link for joining the live event on the day of the live event. In example embodiments, the confirmation may indicate that virtual seats at the live event are available on a first-come, first-served basis (e.g., until the seats are filled up). In example embodiments, the confirmation may include a call time that specifies a time at, or time period during which, the user is to activate the link for accessing the live event.

The confirmation may indicate that, upon claiming a virtual seat on the day of the event, the user may join other fans who will appear live during the event (e.g., on digital video boards set up within a venue of the event). In example embodiments, the confirmation may be divided into multiple messages. A message may be provided upon successful registration by the user, but may not include the link (see, e.g., FIG. 15). An additional message may be provided indicating whether the user has been placed in a standby group (e.g., when all of the virtual seats have already been claimed). A further message may include the link (e.g., based on a determination that virtual seats are available) and may be provided at a later time, such as on the day of the live event (see, e.g., FIG. 16A and FIG. 16B. In example embodiments, the confirmation may specify various policies or guidelines, including, for example, for the user to make sure that the user is camera ready for appearing on a live broadcast.

For example, the confirmation may indicate that the virtual fan audience may be refreshed throughout the night and that the user may not be included in the broadcast. The confirmation may indicate that the user may be removed from the live stream for any inappropriate conduct or technical issues. The confirmation may specify that the user is to position himself or herself in a particular way in front of the user's camera, such as from the user's midsection up, leaving a little room above the user's head, making sure the user has good lighting, keeping other people out of the video feed, wearing appropriate attire, keeping clothing on, and so on.

In example embodiments, the confirmation may indicate that the particular attire may be preferred, such as officially-licensed clothing of a producer or sponsor of the event. In example embodiments, the confirmation may specify that the user's participation may be terminated for any reason, including if the user's clothing includes immoral graphics, images, or text, or any political statements, slogans, logos, graphics, or other commercial identification of third parties other than that of the event producer, the talent (e.g., athletes) of the event producer, or sponsors of the event.

In example embodiments, upon activation of the virtual show link during the live event (e.g., at the specified call time), the user may be notified via the one or more user interfaces of a status of the user in claiming a virtual seat. For example, if all of the virtual seats have been claimed, the user may be presented with an indication via the one or more user interfaces of the user's position in a standby group. In example embodiments, upon being placed in a standby group and upon a virtual seat opening up, the user may be provided with a new virtual show link via the one or more user interfaces for accessing the newly-opened virtual seats.

Figure 17:
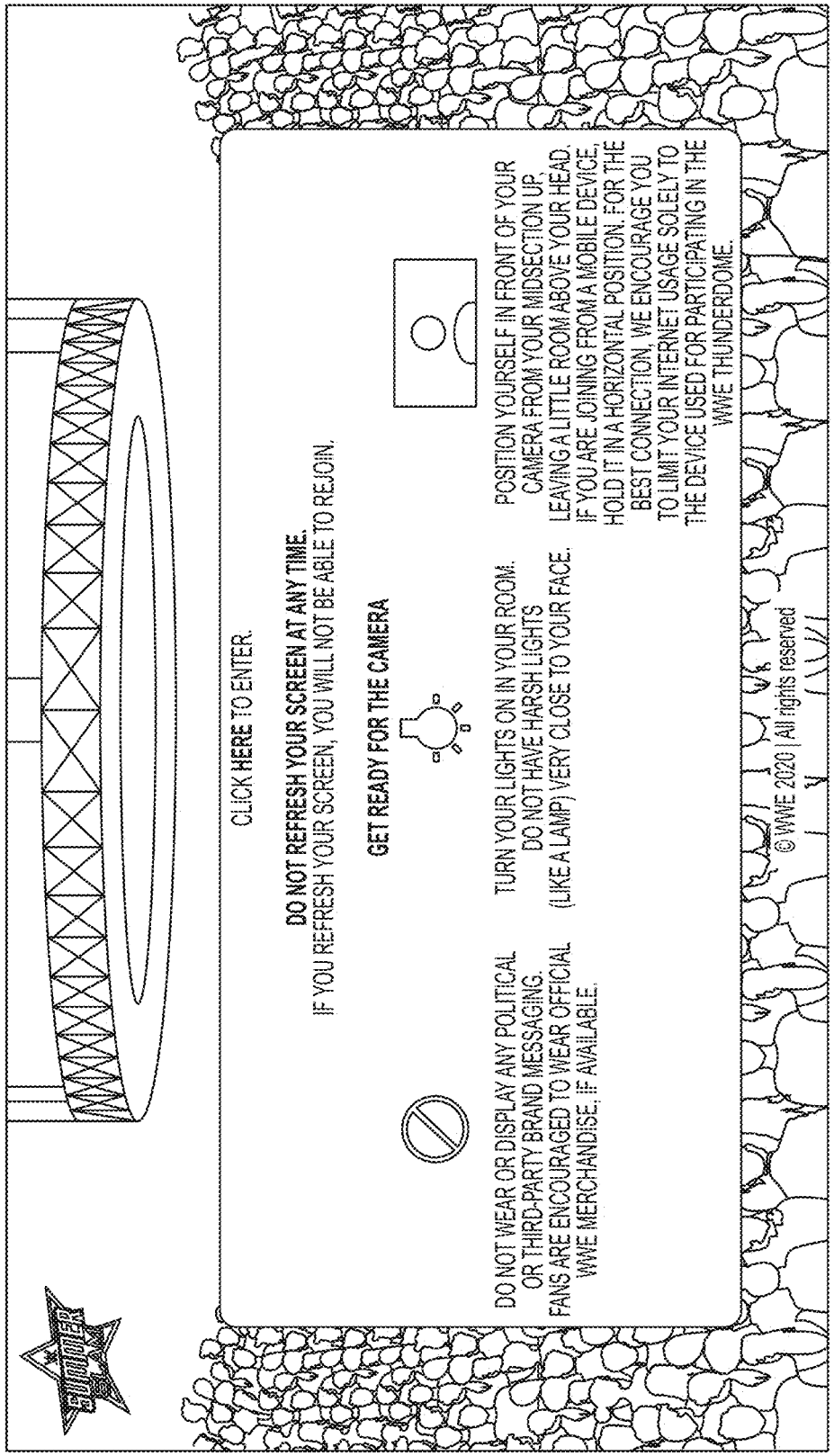
FIG. 17 depicts an example user interface for connecting to a live event platform to obtain a virtual seat for a live event.

Upon a determination by the live event platform that the link is valid (e.g., that a virtual seat corresponding to the link has not been claimed by another user and/or that a single device is being used for the accessing of the live event platform), the one or more user interfaces may be updated to reflect a status of the user in accessing a virtual seat (see, e.g., FIG. 17). For example, the one or more user interfaces may reiterate particular policies associated with the claiming of the virtual seat by the user, including messages pertaining to attire brand requirements or guidelines, lighting guidelines (e.g., not having harsh lights very close to the user's face), and camera-positioning requirements or guidelines, such as, for a mobile device, holding the mobile device in a horizontal position, and bandwidth guidelines (e.g., limiting interact usage solely to the device used for participating in the live fan experience). In example embodiments, the confirmation that the link is valid may include performing a handshake with the video cloud 110. In example embodiments, if a user has been previously booted, the link provided to the user will no longer be valid. In example embodiments, the link verification process is performed by a separate process executing in the cloud environment before a user is authorized to access the video cloud 110.

The one or more user interfaces may be dynamically updated in real time with an additional link for accessing the video cloud of the live fan experience (e.g., based on a determination that a virtual seat is available).

At operation 206, based on the user being granted access to the video cloud, the one or more user interfaces may assist the user in configuring a live video and/or audio feed to be communicated from the device of the user to the live event platform (see, e.g., FIGS. 18A-G). In example embodiments, interactions by the user with the one or more user interfaces cause a microphone of the user's device to be made accessible to the live event platform (see, e.g., FIG. 18B). In example embodiments, when more than one microphone is connected to the device, the one or more user interfaces allow the user to select the correct microphone for sending an audio feed to the live event platform (see, e.g., FIG. 18C). In example embodiments, when more than one camera is connected to the device, the one or more user interfaces allow the user to select the correct camera for sending a video feed to the live event platform (see, e.g., FIG. 18D). In example embodiments, what is captured in the feed is presented to the user in the one or more user interfaces to assist the user in making this determination. In example embodiments, when the correct microphone and camera have been selected by the user, the user is presented with an option to claim the virtual seat, joining the live fan experience (see, e.g., FIG. 18E).

Figure 18A:
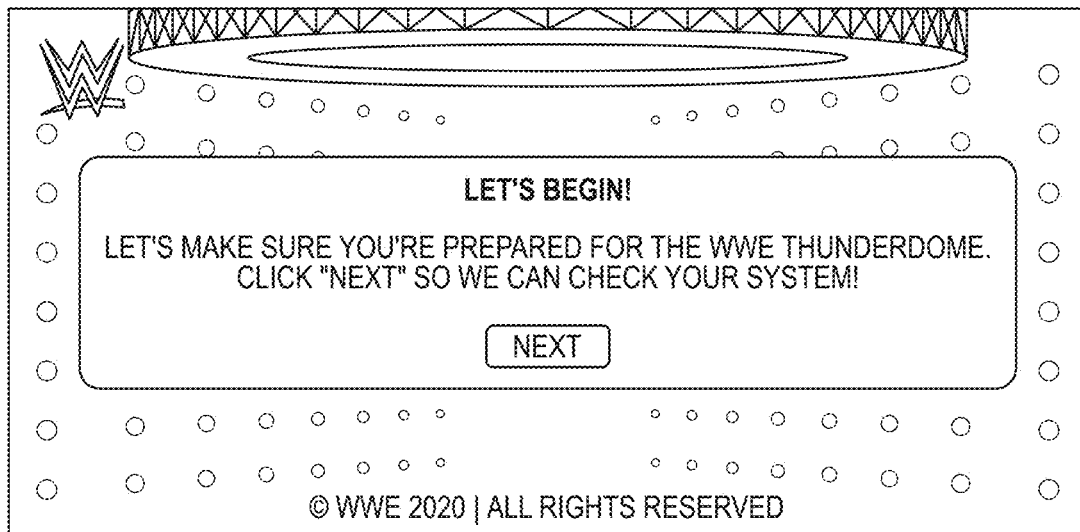
FIGS. 18A-18G depict example user interface screens for configuring a user device to connect to the live event platform and for taking a virtual seat to participate in a live event.
Figure 18B:
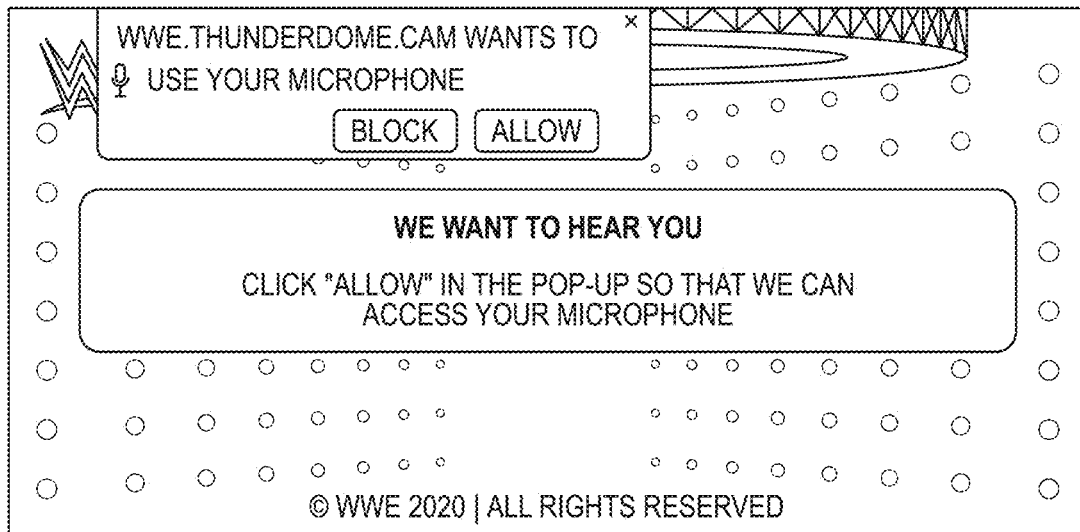
Figure 18C:
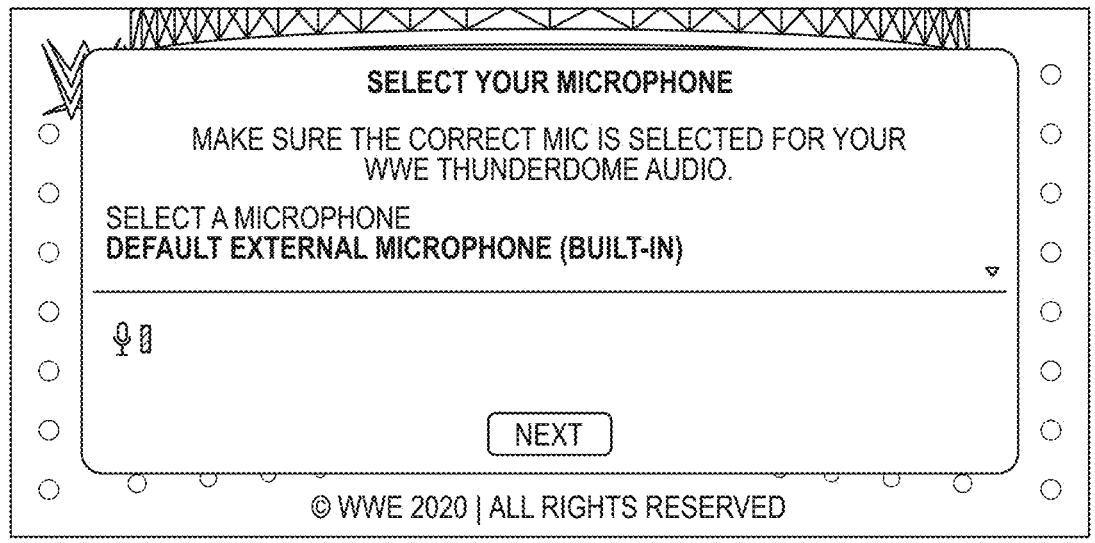
Figure 18D:
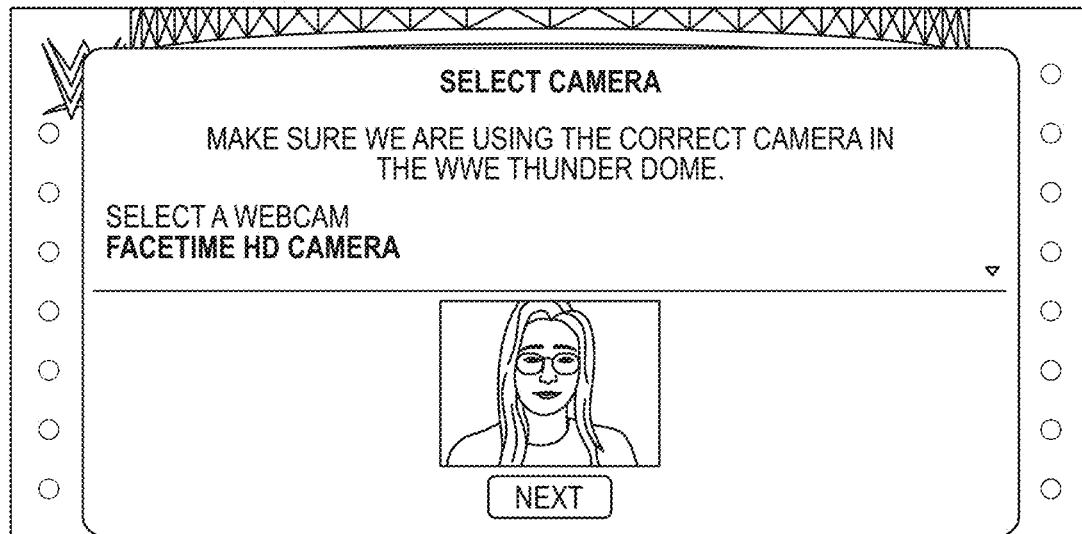
Figure 18E:
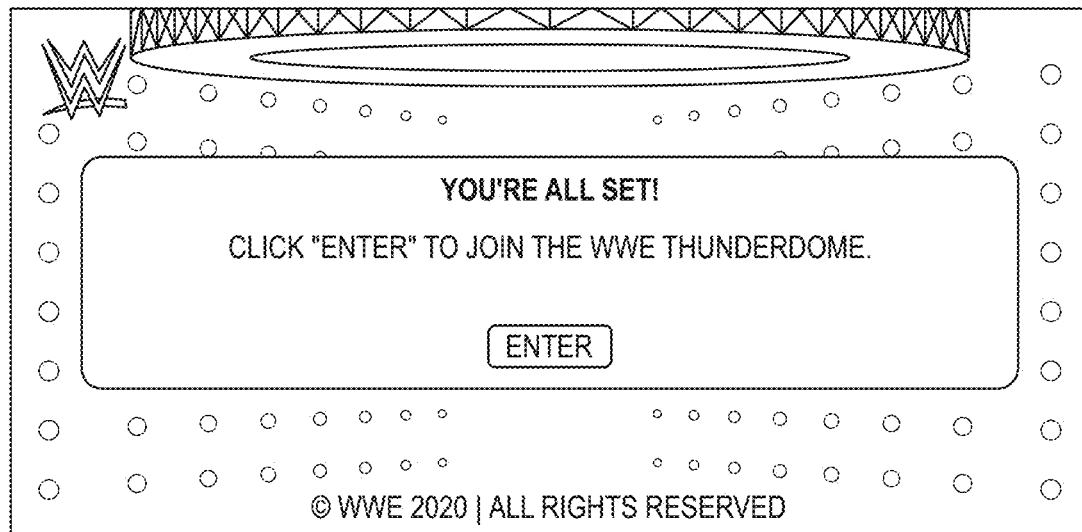
Figure 18F:
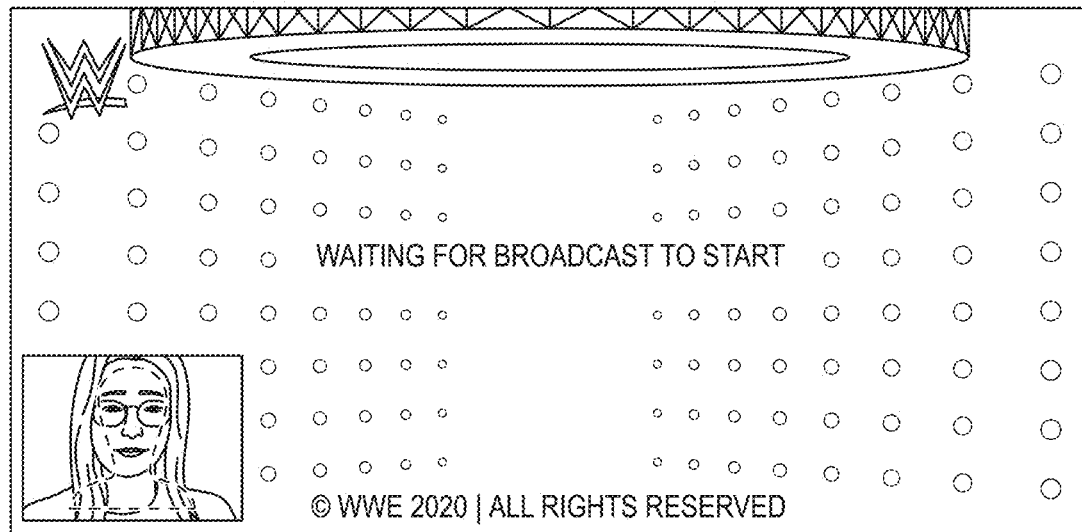

In example embodiments, before and during the live broadcast, the one or more user interfaces includes a region in which the live video teed of the user is shown to the user. The region may include one or more indicators of how the user should adjust the video feed (e.g., to satisfy one or more policies of the live event platform). As shown in FIG. 18F, dashed lines overlaid over the video feed indicate where the user's face should fit within the video feed to satisfy the policies. Thus, for example, the user depicted in FIG. 18F should move away from the camera and/or position the camera such that the user's face fits more appropriately within the dashed region. In example embodiments, the conformance of the user with policies like this may affect a prominence of the virtual seat of the user within the live broadcast, as explained in more detail below. Additionally, as explained in more detail below, the user may be automatically prompted to adjust their position within the frame or make various other corrections (e.g., based on a detection by a machine-learned algorithm that a policy has been violated). By enforcing certain policies, fans in the virtual fan seating area will be relativity the same size (distance and height/centered to/from their individual device cameras), which adds a level of quality and continuity to the virtual fan experience. In example embodiments, an at least rudimentary live key of the user may be placed on a graphical background with other users in the live stream and the live keys may be placed across a uniform background. In example embodiments, such live keys or backgrounds may adjusted based on various criteria, including quality, color temperature, and size. In this way, processing of the feeds may make the crowd feel more realistic and not distracting during the broadcasting of the live event.

At operation 208, the one or more user interfaces are updated in real time based on a selection of the live video and/or audio feed for integration into the live broadcast. For example, the user may receive a notification that the user's video and/or audio feed has been selected for inclusion at a particular location on one or more display screens set up within the venue.

In example embodiments, users are placed into one or more lobbies for observation by one or more administration system (e.g., the video cloud administration systems 112). For example, users may be randomly placed into groups of a predetermined size for monitoring by the administration systems. In example embodiments, the one or more administration systems 112 may deploy a machine-learned algorithm to detect any policy violations occurring within each group. Based on a violation being detected, a user may be warned to take a corrective action or the user may be booted or kicked from the video cloud 110. Users may be permanently booted (e.g., a hard kick), which renders them unable to reconnect to the video cloud (e.g., invalidating their access link). Or users may be temporarily booted (e.g., a soft kick), which means they can reconnect to the cloud (e.g., reusing their access link). In example embodiments, users engaging in particularly egregious or frequent policy violations may be even be put on a banned list, preventing them from accessing future live events, in example embodiments, an administrator may communicate with one or more members in each group to prepare them for being put through to the live broadcast. In example embodiments, data pertaining to actions of an administrator with respect to a group is saved for use in training the machine-learned model. In example embodiments, when a video feed transgresses a certainty threshold with respect to violation of a policy, the machine-learned model is applied automatically to perform the corrective action without administrator input.

In example embodiments, groups may be reserved for users having a particular call time. Thus, for example, a user's link to access the video cloud may be active at or around the call time only, whereas other users may be claim virtual seats on a first-come, first-served basis. In example embodiments, one or more groups may be reserved for VIPs. VIPs may have special privileges to leave and come back to the group, and be seated in the virtual fan area, without having to wait in standby and without having to arrive at a particular call time. In contrast, in example embodiments, a user who has claimed a non-VIP virtual fan seat may lose the non-VIP virtual fan seat in certain circumstances, such as upon exiting the lobby or losing a connection. In example embodiments, various different tiers of seats (standby, call time, VIP) may be offered for sale at different price points via a shop that is accessible from an online store associated with the live event. In example embodiments, some virtual fan seats may be located in specific locations within the venue, whereas other virtual fan seats may be randomly assigned. Thus, for example, premium or "sweet" seats may be claimed (e.g., for a price), which may be featured more prominently in the broadcasting of the live event. In example embodiments, some seats may be temporary virtual seats (e.g., located at a premium location only for a portion of the broadcasting). In example embodiments, a VIP virtual fan seat may be excluded from enforcement of certain policies that are applicable to the virtual fan seats. For example, a VIP virtual fan seat may not be automatically removed from the broadcast even when a person is not detected as being present within the video feed or even when the person is not in a particular position within the video feed. Thus, for example, an administrator may configure policies differently for different tiers of seats and train corresponding machine-learning algorithms accordingly.

In example embodiments, a plurality of servers is allocated in the cloud based on various factors, such as a number of live video feeds connected to the video cloud, a number of groups of the live video feeds, a number of video cloud administration systems, and a performance metric (e.g., a latency tolerance). Thus, for example, 900 people, organized into groups of 25, may be allocated 36 servers, to ensure both latency and administration requirements are satisfied. In example embodiments, each of the 36 servers corresponds to a video stream that is fed into the master control room 120 for further processing.

At operation 210, the one or more user interfaces are updated in real time based on the integration of the live video and/or audio feed occurring during the live broadcast. Thus, for example, an indication in the user interface may be updated in real time to specify whether the user's audio and/or video feed is currently being broadcast to other viewers or can been seen or heard by other viewers.

In example embodiments, as discussed above, the one or more user interfaces may include a lobby area. The lobby may include a chat area (e.g., for chatting with other virtual fans) and/or a shopping area (e.g., for purchasing fan merchandise). In example embodiments, the lobby area may include information about one or more other users who are waiting for virtual seats or who have successfully claimed virtual seats. In example embodiments, the user receives notifications of various events, including when the user successfully claims a virtual seat, when the user has been moved to a different virtual seat, when the user has been kicked out of a virtual seat (e.g., for violating a policy), when the user is being featured in a live broadcast, and so on. In example embodiments, the user receives notifications pertaining to other virtual fans, such as notifications of when another user successfully claims a virtual seat, when another user has been moved to a different virtual seat, when another user has been kicked out of a virtual seat for violating a policy, when another user is being featured in a live broadcast, and so on. In example embodiments, the lobby may be configurable by the user (e.g., to include only people invited by the user).

Figure 18G:
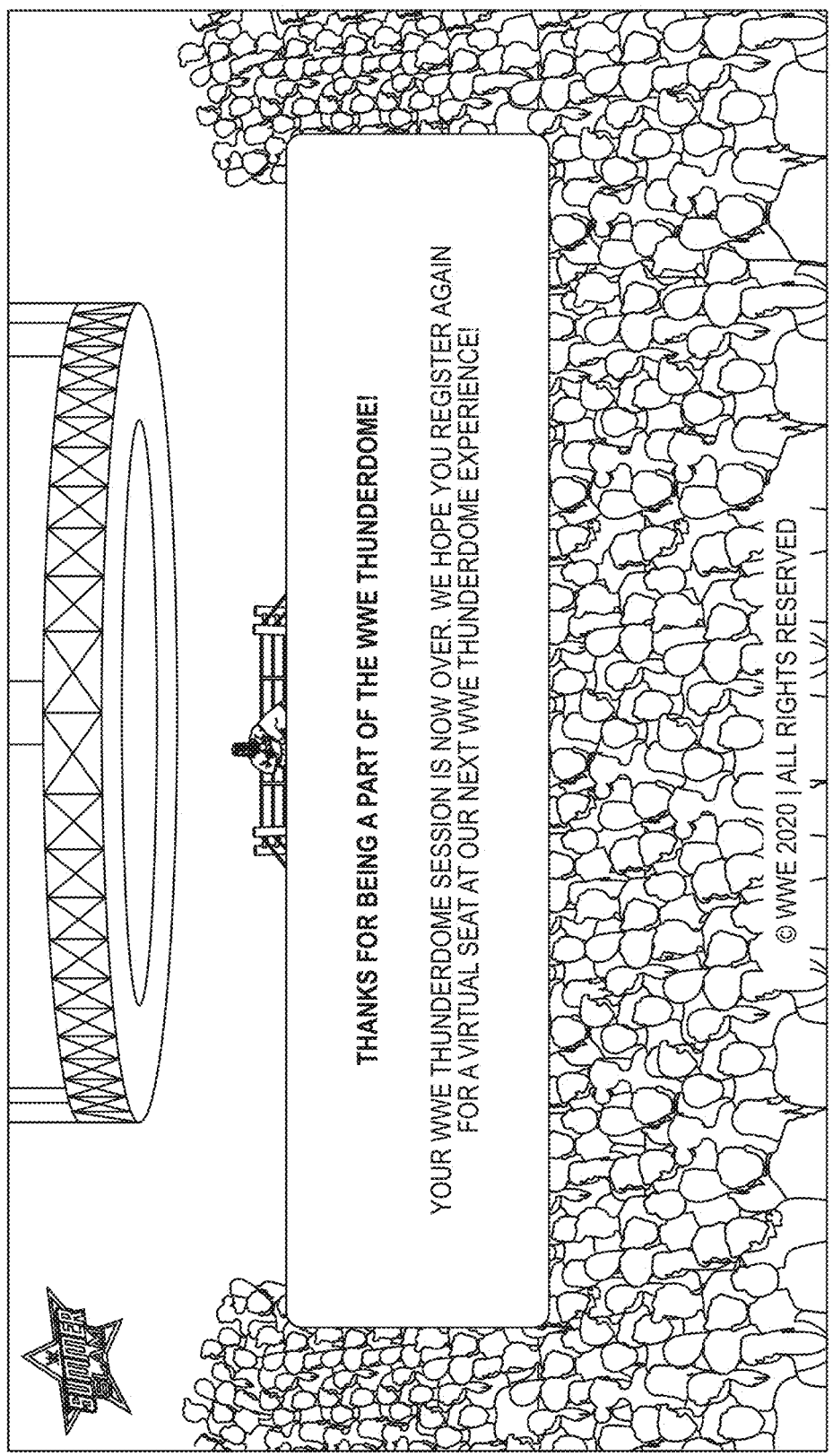

In example embodiments, the one or more user interfaces may be updated to reflect that the user has been kicked from the live fan experience (e.g., based on a violation by the user of a policy, a technical problem with the transmission of the audio and/or video feed of the user, or an ending of the live event) (see, e.g., FIG. 18G).

In example embodiments, the shop may include virtual venue upgrades, including, for example, one or more VIP experiences, such as being able to talk directly with an athlete, performer, or celebrity during the event, purchase a VIP virtual seat to get premium placement in the broadcast, featured placement of a video or live stream during at least portion of the broadcast. In example embodiments, for limited-quantity items, such as a luxury seat (having a premium location) or VIP seat, the user may be notified when a seat opens up (e.g., when another user leaves the seat or has completed a VIP experience). Such notifications may include offers for the item that has become available, and may be packaged with various extras, such as a special merchandise item, an offer for a shout out by an athlete or other participant, or an additional camera angle visible only to subscribed users. The notifications may be provided to the users in real time and optionally accepted by the users during the live broadcast.

In example embodiments, the shop may include a secure pay wall and offer an ability to choose and pay for virtual seats by selecting available virtual seats on a virtual seat map, and ability to purchase a virtual seat or a group of virtual seats (e.g., season ticket to multiple events), or an ability to purchase a virtual seat for a single event (e.g., of any of the tiers discussed herein).

In example embodiments, the lobby area includes a location where registered virtual fans can hang out and interact with each other. In example embodiments, the lobby is available before, during, and after the live show. In example embodiments, the virtual lobby is a real-time rendered 3D experience (e.g., pixel streaming or WebGL) with an immersive interactive user interface for watching the live stream, real-time statistics, unique camera views, text chatting, video chatting, playing trivia games, participating in polls, accessing exclusive merchandise, and even creating a customizable avatar to place into the virtual lobby area.

Figure 3:
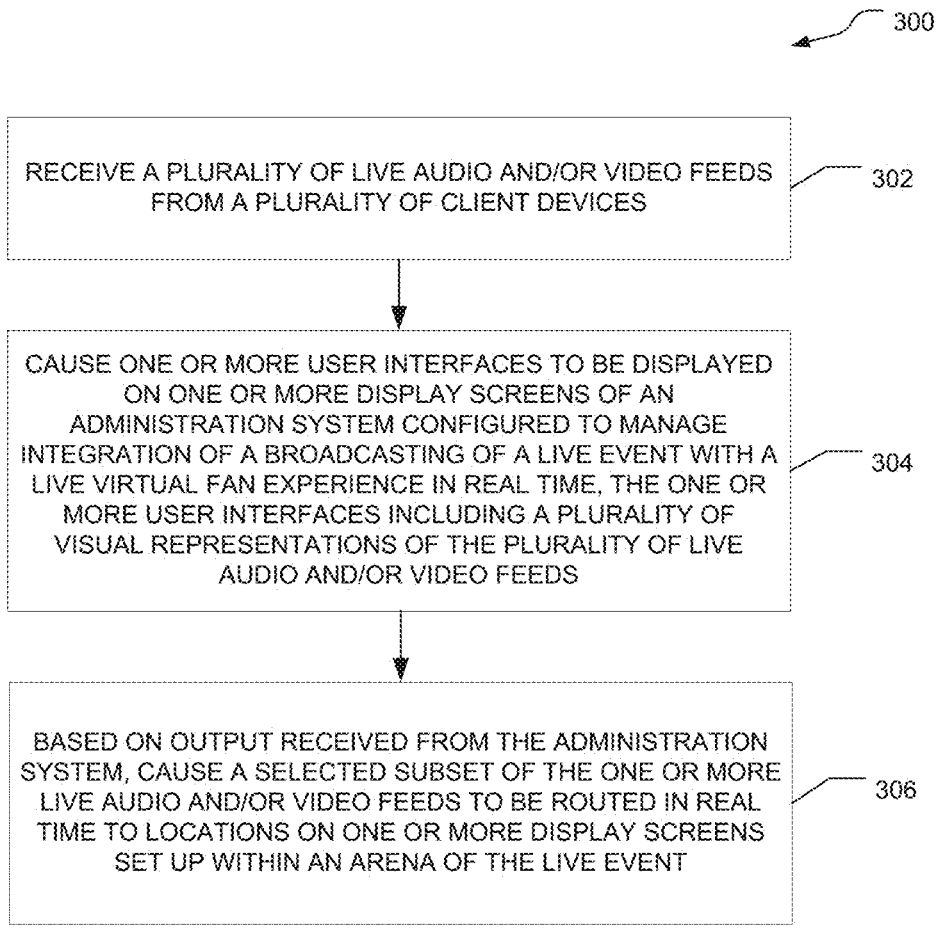
FIG. 3 is an example of a method of routing selected live audio and/or video feeds to a venue of a live event for including in a broadcasting of the live event.

FIG. 3 is an example of a method 300 of routing selected live audio and/or video feeds to one or more display screens set up in a venue of a live event for including m a broadcasting of the live event. In example embodiments, the operations of the method 300 are implemented using one or more services of the live event platform 110 or the master control room 120.

At operation 302, a plurality of live video and/or audio feeds from a plurality of devices of a plurality of users is connected to the live event platform. In example embodiments, the live event platform may be implemented using a streaming video service. As described above, the live event platform, including the streaming video service, may be deployed in a cloud environment using cloud infrastructure. In example embodiments, the cloud infrastructure may be configured to dynamically allocate resources, such as processing power, memory, and network resources based on the number of users and predetermined performance metrics. Thus, for example, the live event platform may be configured with a very low latency tolerance to, for example, ensure that fan reactions captured on the live video and/or audio feeds are in synchronization with the live event. If and when the latency tolerance level is exceeded, additional resources may be allocated to the live event platform from the cloud infrastructure.

Figure 10:
FIG. 10 depicts a user interface being displayed on an administration console of an administration system.

In example embodiments, as discussed above, the one or more plurality of live video and/or audio feeds are grouped together and connected to a plurality of video streams. In example embodiments, the number of video and/or audio feeds that each video stream can accommodate is configurable (e.g., via an administrative user interface). In example embodiments, the size of each video stream may be automatically determined or configured (e.g., based on application of a machine-learned model trained to minimize latency). Thus, for example, as depicted in FIG. 10, each video stream may be configured to hold 25 audio and/or video feeds.

At operation 304, one or more user interfaces are caused to be presented on one or more display screens of an administration system (e.g., via a web application or a client-server application). In example embodiments, the one or more administration user interfaces are configured to allow one or more administrators to select and/or organize a subset of the one or more video and/or audio feeds in real time for displaying on one or more display screens set up within an venue of the live event.

At operation 306, based on communications received from the administration system, a selected subset of the one or more video and/or audio feeds is routed to locations on the one or more display screens set up within the venue of the live event. In example embodiments, the routing includes choosing appropriate pathways through software- or hardware-implemented audio/video inputs associated with a virtual fan venue system that is connected to the live event platform. In example embodiments, the virtual fan venue system includes a one or more display screens arranged within the event venue having locations that correspond to virtual fan seats and within which the selected subset of the video feeds may be displayed (see, e.g., FIG. 6-8). In example embodiments, the live video feeds may be configured to automatically fill all available seats in the virtual fan venue systems 118 without input from an administrator and without duplication of the live video feeds. Thus, for example, using a predetermined or configurable distribution algorithm, administration systems in the master control room may send each stream or group of video feeds (e.g., as multiple HDMI feeds) through a real-time graphics server and out onto one or more LED display boards set up in the venue.

In example embodiments, the images routed to the one or more displays in the venue may be enhanced in real time. Such enhancements may include mapping individual live virtual fans to three-dimensional graphical assets (e.g., custom virtual seats built with a gaming engine that hold the live feeds of the virtual fans). In example embodiments, these are called "live tiles." In example embodiments, the real-time 3D seats can perform a series of animations in coordination or on an individual level. For example, individual seats can rotate, scale, move, etc., or all the seats could move together forming some interesting animations, such as a virtual wave traveling from one side of the display screen to the other. In example embodiments, live tiles can include sponsorship branding and live triggerable effects.

In example embodiments, certain graphics effects may be triggerable by the users during the live event. For example, a user may be able to react with emojis (e.g., hearts, thumps up, and so on), display a virtual glow stick, place a text message, or otherwise edit their video feeds in real time. In example embodiments, an administrator may offer configurable options in the user interface presented on the client device of the user for enhancing their video feeds. In example embodiments, various triggerable graphical effects may be offered and enabled as part of a VIP experience that may be purchased by the users. In example embodiments, user interfaces presented on the client devices of selected users may be updated in real time with user interface controls that enable the user to trigger one or more graphic effects.

Figure 4:
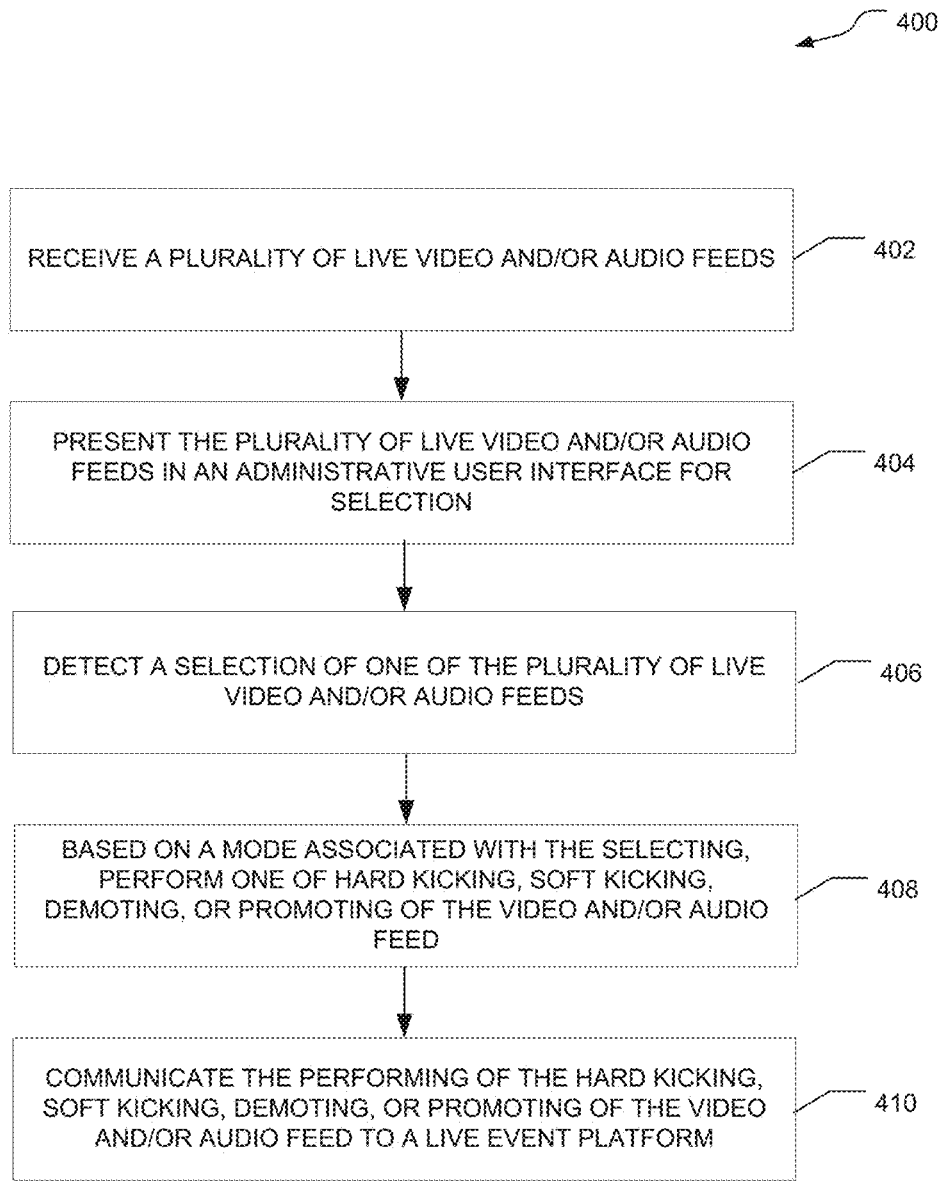
FIG. 4 is an example method for managing integration of a broadcasting of a live event with a live virtual fan experience in real time.

FIG. 4 is an example method 400 for managing integration of a broadcasting of a live event with a live virtual fan experience in real time. At operation 402, a plurality of live video feeds is received at an administration system from a live event platform.

At operation 404, the plurality of live video feeds is presented in one or more administration user interfaces of one or more administrative consoles of the administration system. In example embodiments, the one or more administration user interfaces include a raw "STREAMS" view of the plurality of audio and/or video feeds. In example embodiments, the streams view allows an administrator to scroll through all of the video streams into which the video and/or audio feeds have been grouped by the live event platform (see, e.g., the user interface depicted on the display screen of FIG. 10 and the user interface depicted on the right display screen of FIG. 12.) In example embodiments, one or more of the audio/video feeds in the raw streams view may not be assigned to a virtual seat.

Figure 6:
FIG. 6 depicts an example virtual fan venue system.
Figure 7:
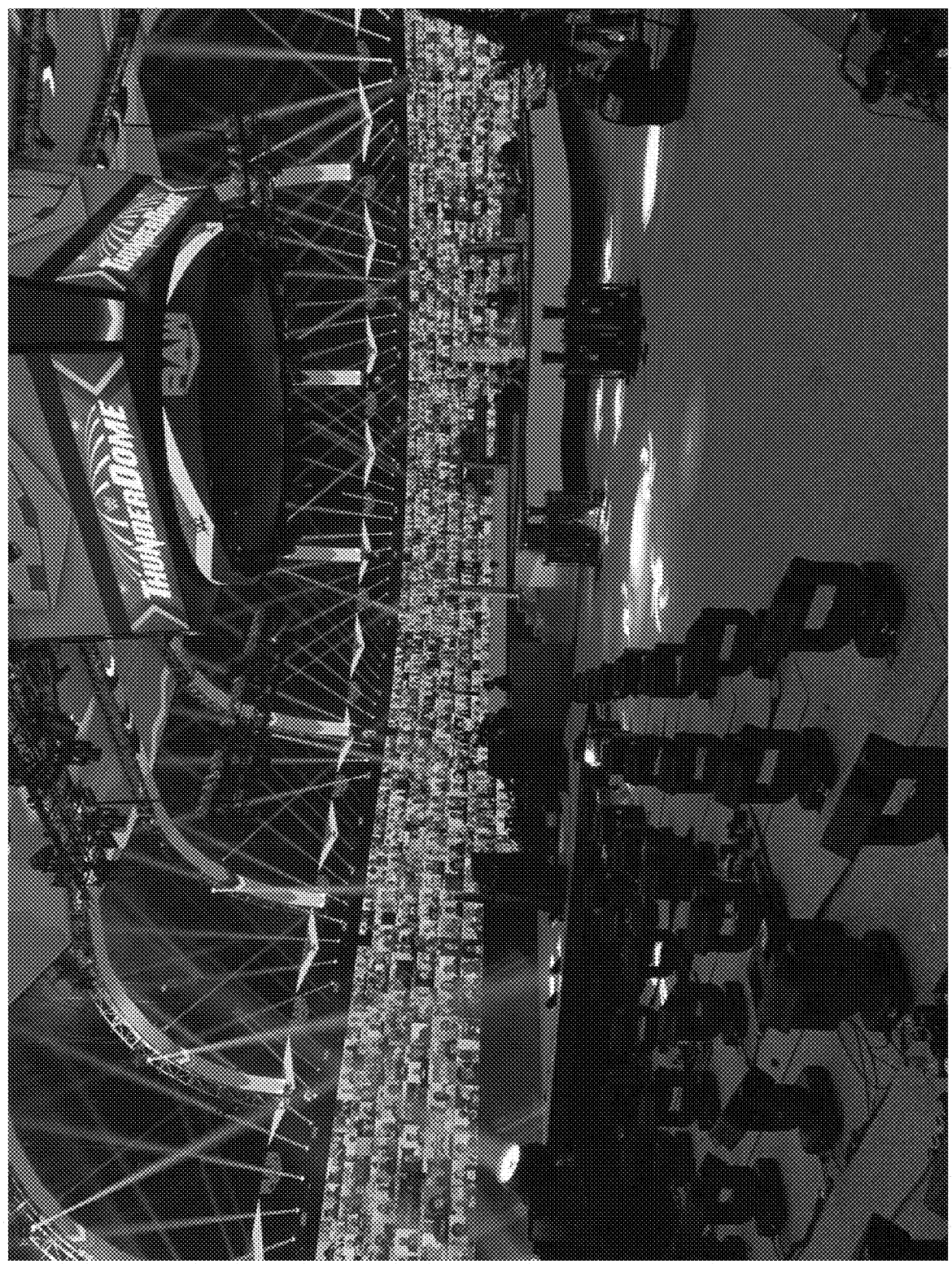
FIG. 7 depicts another example virtual fan venue system.
Figure 8:
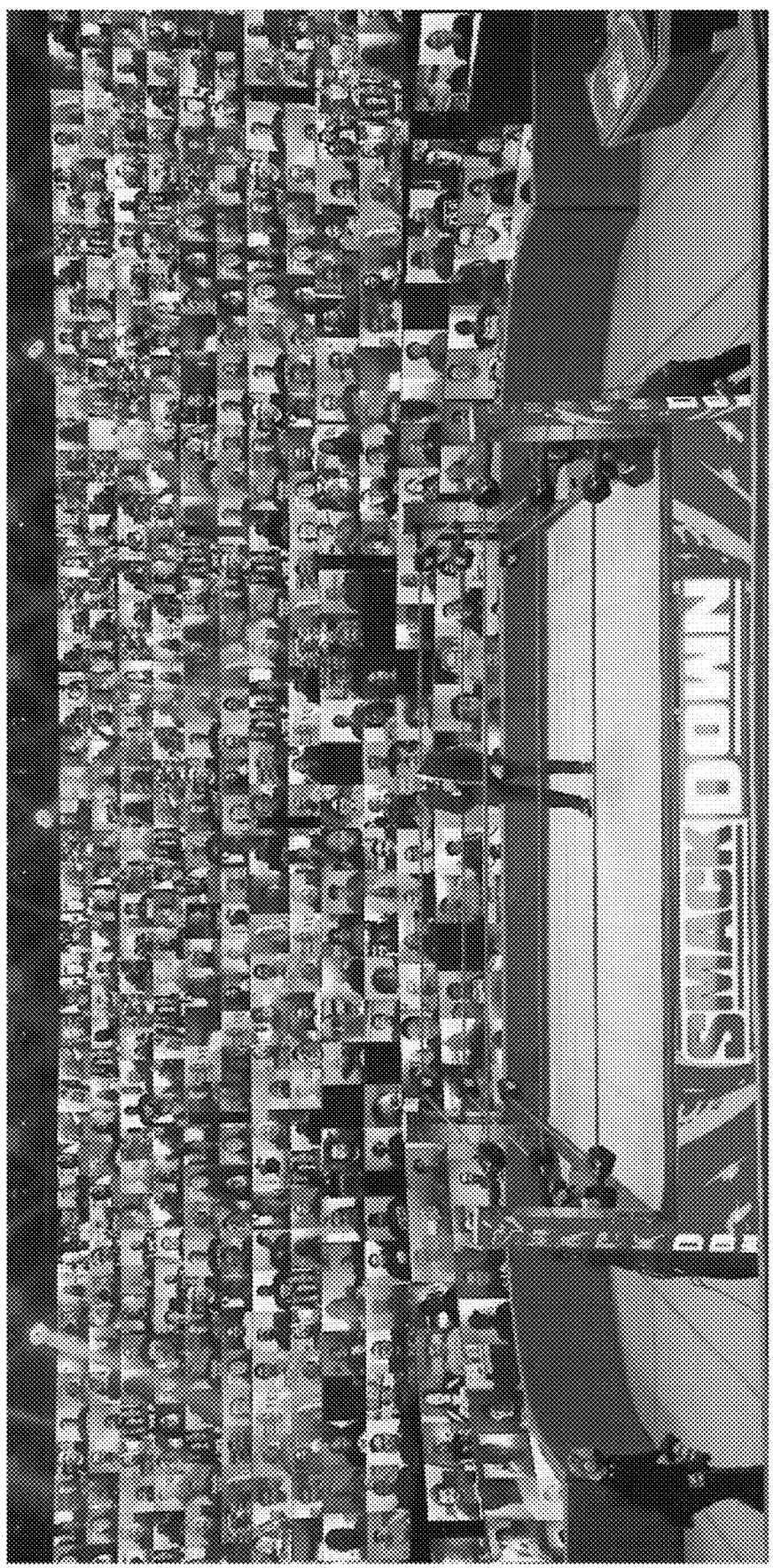
FIG. 8 depicts another example virtual fan venue system.

In example embodiments, the one or more administration user interfaces include an "ALL" virtual seats view. In example embodiments, the all virtual seats view may allow an administrator to scroll through one or more groups of the audio/video feeds that have been assigned to virtual seats. In example embodiments, the groups may correspond to "ribbons" of virtual seats in the venue of the live event. In example embodiments, a ribbon may include a row of seats arranged around the venue (e.g., for including one or more panorama views). Examples of the virtual fan venue systems having one or more display screens arranged around a venue are shown in FIGS. 6-8). In example embodiments, each group of virtual seats may be selectable by a user interface element corresponding to each group. For example, see the user interface shown in the right display of FIG. 11. Here, the administrator can select a user interface element corresponding to a group of video and/or audio feeds (e.g., 0, 1, 2, 3, 4, 5, 6 . . . ) to view all of the video and/or audio feeds included in that group, in example embodiments, both the selectable group numbers and the video and/or audio feeds are scrollable within their respective screen areas.

In example embodiments, the one or more administration user interfaces include a "SWEET SEATS" view. In example embodiments, the sweet seats view includes one or more groupings of video and/or audio feeds that have been assigned virtual seats that are most likely to be seen in a live broadcast of the live event, such as front-row seats, box seats, VIP seats, and so on. In example embodiments, the sweet seats view may also include a selected set of "BROADCAST" seats (see, e.g., the "BROADCAST box in the lower right corner of the user interface presented on the right display in FIG. 13). In example embodiment, the broadcast seats are virtual seats that are currently being featured or are about to be featured in the live broadcast of the event. In example embodiments, the sweet seats view may include one or more other groupings of virtual seats, such as groups corresponding to rows of virtual fan seats in the venue, in example embodiments, the groupings of live video and/or audio feeds may be dragged to new positions or resized within the user interface, the video and/or audio feeds within each grouping may be scrolled through or zoomed in on or zoomed out from, and so on, to allow the administrator to quickly navigate around the virtual seats. In example embodiments, video and/or audio feeds may be dragged to new groups or to different seats.

At operation 406, a selection of a video and/or audio feed is detected.

At operation 408, an action is performed with respect to the selected video and/or audio feed. In example embodiments, the action depends on the mode of the administration console on which the one or more user interfaces are being presented. The one or more modes may include a hard-kicking mode, a soft-kicking mode, and a favorites mode. When the one or more administration user interfaces are placed into hard-kicking mode, a selection of a video and/or audio feed by the administrator may cause the video and/or audio feed to be permanently booted from the live event platform. When the one or more user interfaces are placed into a soft-kicking mode, a selection by the administrator of a video and/or audio feed may cause the video and/or audio feed to be temporarily removed (e.g., through obfuscation of the live video feed or movement of the live video feed to a less prominent area within the virtual fan seating area). In example embodiments, the selection may be automatically returned to its original location and/or have its obfuscation removed after a configurable time period has elapsed. When the one or more user interfaces are placed into favorites mode, a selection by the administrator of a video and/or audio feed may cause the video and/or audio feed to be moved into a more prominent location in the virtual fan seating area, which may make it more likely that the video and/or audio feed will be included in the live broadcast.

Figure 13:
FIG. 13 depicts the side-by-side administration consoles of FIG. 11 and FIG. 12 at a different point in time.

In example embodiments, the one or more user interfaces are distributed across multiple administration consoles. Thus, for example, three separate administrators could be responsible for implementing the hard-kicking, soft-kicking, and favorites functions. In example embodiments, an action taken at one administration console causes a notification to be sent to each other administration consoles describing the action that was taken, including the location of the virtual seat that was affected (e.g., see FIG. 13, showing the message "SOFT KICK RIBBON 1 SLOT 94" in the lower left corner of the screen). In FIG. 13, the administrator on the left had performed a soft-kicking action at the designated location and the administrator on the right was notified of the action having been performed.

In example embodiments, distributing the functions across multiple administration consoles may allow administrators to quickly kick, promote, or demote many video/audio feeds simultaneously, thus enabling to quickly find the most compelling video and/or audio feeds for featuring in the live broadcast. In example embodiments, the one or more administrative consoles include touch-screen displays, thus further supporting quick action by the administrators. Additionally, the administration consoles may be separated by large distances to keep risk of virus (e.g., Covid-19) transmission as low as possible.

In example embodiments, actions performed by the administrators may be recorded for training of one or more machine-learned models for performing likely administrative functions automatically. The model may be trained based on features of the video and/or audio feeds (e.g., clarity, lighting, conformance to policies, and so on), metadata pertaining to the video and/or audio feeds (e.g., transmission quality), and actions taken by the administrators with respect to each video and/or audio feed. In example embodiments, one or more machine-learned models may be applied to automatically perform likely administrative actions (e.g., when a predicted likelihood of the action being performed by the administrator is surpassed) or to recommend administrative actions. In example embodiments, the user interface may highlight recommended actions in the user interface that can be instantly activated upon with a single click by the administrator (e.g., when the predicted likelihood of the action being performed by the administrator is not surpassed).

In example embodiments, one or more machine-learned algorithms or neural networks are trained to automatically perform one or more of the following: cover or replace someone getting up and leaving their seat, cover or replace lude gestures, cover or replace a person putting on a mask or face covering, cover or replace nudity, cover or replace inappropriate logos on apparel, send messages to virtual fans who are not in the correct camera position or need to make any other adjustment.

In example embodiments, the one or more user interfaces may include an option for the administrator or a participant in the live event to communicate directly to a user or group of users (e.g., via the lobby of the live via the live fan experience being presented on the device of the user from which the live video and/or audio feed is being captured). Thus, for example, an administrator may provide specific instructions to a user to make a correction to their positioning of the camera or their lighting prior to moving them to a virtual seat that is likely to be featured in the live broadcast. Or one or more fans may be able to have a discussion with a participant in the live event during the broadcasting of the live event or during an intermission of the live event (e.g., as a separately purchased VIP experience).

In example embodiments a plurality of audio feeds associated with the plurality of selected live video feeds is output in the venue in real time during the broadcasting of the live event (e.g., as fan noise). In example embodiments, the audio may be filtered (e.g., by machine-learned algorithms trained based on administrator input) to adjust for various factors, including audio quality or other attributes, to sound more realistic. In example embodiments, one or more audio feeds are selected from the plurality of live video feeds to be transmitted in real time to a participant in the venue during the broadcasting of the live event. Thus, for example, a participant could hear a family member, close friend, or other designated virtual fan in real-time during the event. In example embodiments, an audio feed associated with the participant may be captured and transmitted in real time to a device associated with one or more live video feeds. In example embodiments, access to various live audio feeds during the live event may be available for particular users to access or the ability to communicate with a participant during the live event may be offered to one or more users (e.g., as a VIP experience).

In example embodiments, one or more administrator or moderators of the live fan experience may engage with the virtual fans to help with their energy and immersion. For example, moderators may initiate or request real-time coordinated actions, like cheering, clapping, waiving, etc., which may be communicated from one or more consoles in the control room, such as by text messages sent to the fans. In example embodiments, various actions are programmed into single buttons on a master control (e.g., accessible on a user interface of an administration console) that alerts fans to take the actions.

At operation 410, the actions performed within the one or more administrative user interfaces are communicated to the live event platform for performing the corresponding action, including implementing hard-kicking, soft-kicking, demoting, or promoting of the live video and/or audio feeds on the one or more displays set up in the venue. In example embodiments, there are two levels of administration controlling the video feeds—one for the video feeds in the cloud and one for the video feeds that have been moved from the cloud and into the control room. Thus, for example, a kicking of a video feed from the control room (e.g., from one or more administration consoles associated with the administering virtual fan venue system at the venue) may cause the video feed to be returned to the video cloud. Another administrative action may be taken (e.g., from one or more separate administrative consoles associated with the administering video feeds within the video cloud). The machine-learning algorithms discussed herein may be trained and applied at each administration stage. Thus, for example, a first set of machine-learning algorithms may be applied to take action or flag candidate video feeds (e.g., for kicking or promoting) while they are in the video cloud and a second machine-learning algorithm may be applied to take action or flag candidate video feeds (e.g., for kicking or promoting) while they are in the master control room and/or actively being displayed on one or more display boards set up within the venue. Additionally, one or more separate sets of administrative consoles may be deployed for use at each administrative level, allowing for dedicated and/or distributed administration of video feeds in the video cloud or in the control room.

Figure 5A:
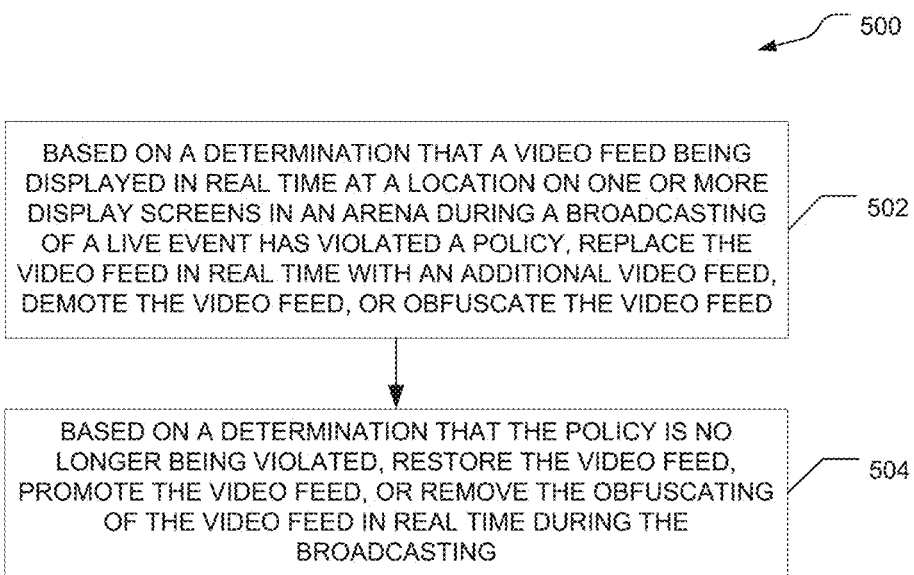
FIG. 5A is an example of a method of implementing an action in response to a violation of a policy.

FIG. 5A is an example of a method 500 of implementing an action in response to a violation of a policy. In example embodiments, the operations of method 500 may be implemented by one or more services of the live event platform 110. At operation 502, based on a determination that a video and/or audio feed of a plurality of live video feeds being displayed on one or more display screens set up within a venue of the live event has violated a policy, the feed is removed, the feed is demoted, or the feed is obfuscated on the one or more display screens in the venue in real time during the broadcasting. For example, a graphic may be placed over a video feed of a misbehaving virtual fan.

At operation 504, based on a determination that the video and/or audio feed is no longer violating the policy, the video feed is restored, the video feed is promoted, or the obfuscating the video feed is removed in real time during the broadcasting.

Figure 5B:
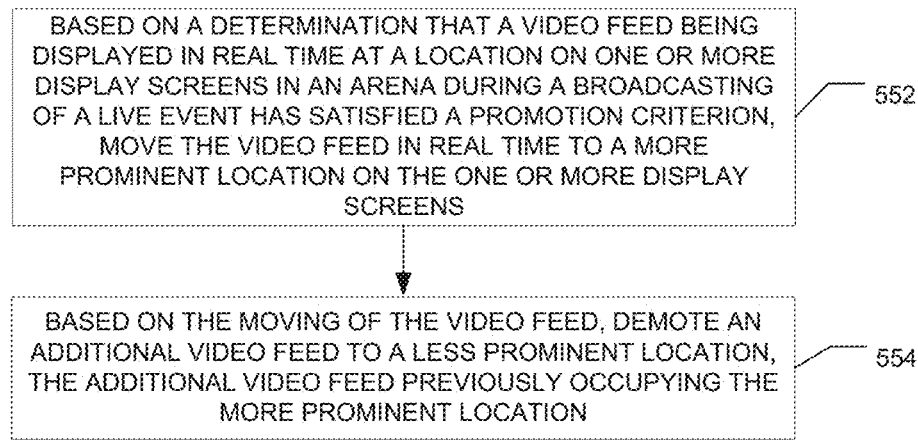
FIG. 5B is an example of a method of implementing an action in response to a violation of a policy.

FIG. 5B is an example of a method 550 of implementing an action in response to a violation of a policy. In example embodiments, the operations of method 550 may be implemented by one or more services of the live event platform 110. At operation 552, based on a determination that a video and/or audio feed of a plurality of live video feeds being displayed on one or more display screens set up within a venue of the live event has satisfied a promotion policy, moving the video feed to a more prominent location on the one or more display screens in real time during the broadcasting.

At operation 554, based on the moving of the feed, demoting an additional video and/or audio feed to a less prominent location, the additional video feed previously occupying the more prominent location.

In example embodiments, the determinations of policy violations and/or satisfaction of promotion criteria may be based on application of one or more machine-learned models and/or input from an administrator via the one or more administrative user interfaces.

FIG. 6 depicts an example virtual fan venue system. As shown, the virtual fan venue system for "Summer Slam" includes LED boards set up within multiple panoramic views of the venue. Locations within the LED boards are designated as virtual fan seats. Video and/or audio feeds from users located remotely are routed into the locations on the LED boards corresponding to the virtual seats to which the users have been assigned. The video and/or audio feeds are then curated in real time during the broadcasting of the event through the administration systems and/or application of machine-learned algorithms.

FIG. 7 depicts another example virtual fan venue system. As shown, the virtual fan venue system for "Thunderdome" includes a different arrangement of LED boards than virtual fan venue system shown in FIG. 6. However, just as shown in FIG. 6, locations within the LED boards are designated as virtual fan seats. Video and/or audio feeds from users located remotely are routed into the locations on the LED boards corresponding to the virtual seats to which the users have been assigned. The video and/or audio feeds are then curated in real time during the broadcasting of the event through the administration systems and/or application of machine-learned algorithms.

As an example, a total of 16,296,488 LED pixels may be included in the venue for a WWE Thunderdome event, including 1458 7 mm 600×600 mm tiles for virtual fan seats in ring seats (9,331,200 pixels) and 480 7 mm 600×600 tiles in a Thunderdome truss above the ring (3,072,000 pixels). Three 30 k projectors may cover the ring and 32 20 k projectors may be used for the Thunderdome (16 live and 16 hot back up). Video screen processing may be handled by 32 Nova pro processors (16 live and 16 hot back up), six Nova VX4 processors (3 live and 3 hot back up), 12 CVT's, and 2500' Tac 12 fiber (3@500' and 1@1000') and 2500' Of Cat 6 ethernet cable may be used.

FIG. 8 depicts another example virtual fan venue system. As shown, the virtual fan venue system for "SmackDown" includes a different arrangement of LED boards than the virtual fan venue system shown in FIG. 6 and FIG. 7. However, just as shown in FIG. 6 and FIG. 7, locations within the LED boards are designated as virtual fan seats. Video and/or audio feeds from users located remotely are routed into the locations on the LED boards corresponding to the virtual seats to which the users have been assigned. The video and/or audio feeds are then curated in real time during the broadcasting of the event through the administration systems and/or application of machine-learned algorithms.

Figure 9:
FIG. 9 depicts a broadcast of a live event in which virtual fan seating is shown in the background.

FIG. 9 depicts a broadcast of a live event in which virtual fan seating area is shown in the background. Because each video and/or audio feed is integrated into the live broadcast, it is possible for both viewers and the participants in the venue to see and hear reactions of the fans in real-time as the live event unfolds.

FIG. 10 depicts a user interface being displayed on an administration console of an administration system. In this example, the administration console is placed in hard-kicking mode. Furthermore, the administration console is set to a stream view. Each time the administrator selects (e.g., touches) a video stream, instructions are sent to the live event platform to kick the video stream from the live event platform.

Figure 11:
FIG. 11 depicts user interfaces being displayed on two side-by-side administration consoles of an administration system.

FIG. 11 depicts user interfaces being displayed on two side-by-side administration consoles of an administration system. In this example, the administration console on the left is placed into a soft-kicking mode and a sweet seats view. The administration console on the right is placed into a "favorites" mode and an all virtual seats view. Each time the administrator on the left selects (e.g., touches) a video feed, the selected video is soft kicked. Furthermore, the action performed on the left administration console is identified on the right administration console (e.g., "SOFT KICK RIBBON 0 SLOT 80"). Each time the administrator on the right selects (e.g., touches) a video feed on the right, the selected video feed is identified as a favorite, which may result in the video feed being promoted to a more prominent location in the virtual seating area. Additionally, the action performed on the right administration console is identified on the left administration console. In this way, both administrators can quickly perform their role (soft kicking or favoriting) different videos simultaneously while being notified of what the other administrator is doing.

Figure 12:
FIG. 12 depicts the side-by-side administration consoles of FIG. 11 at a different point in time.

FIG. 12 depicts the side-by-side administration consoles of FIG. 11 at a different point in time. Here, the administrator on the right has switched to a streams view to look for additional favorites.

FIG. 13 depicts the side-by-side administration consoles of FIG. 11 and FIG. 12 at a different point in time. Here, the administrator on the right has switch to a sweet seats view. Additionally, the administrator on the right is scrolling through and zooming in and out from a group of virtual seats associated with a particular row (e.g., "ROW 12") of the virtual fan seating area to identify additional favorites.

Figure 14:
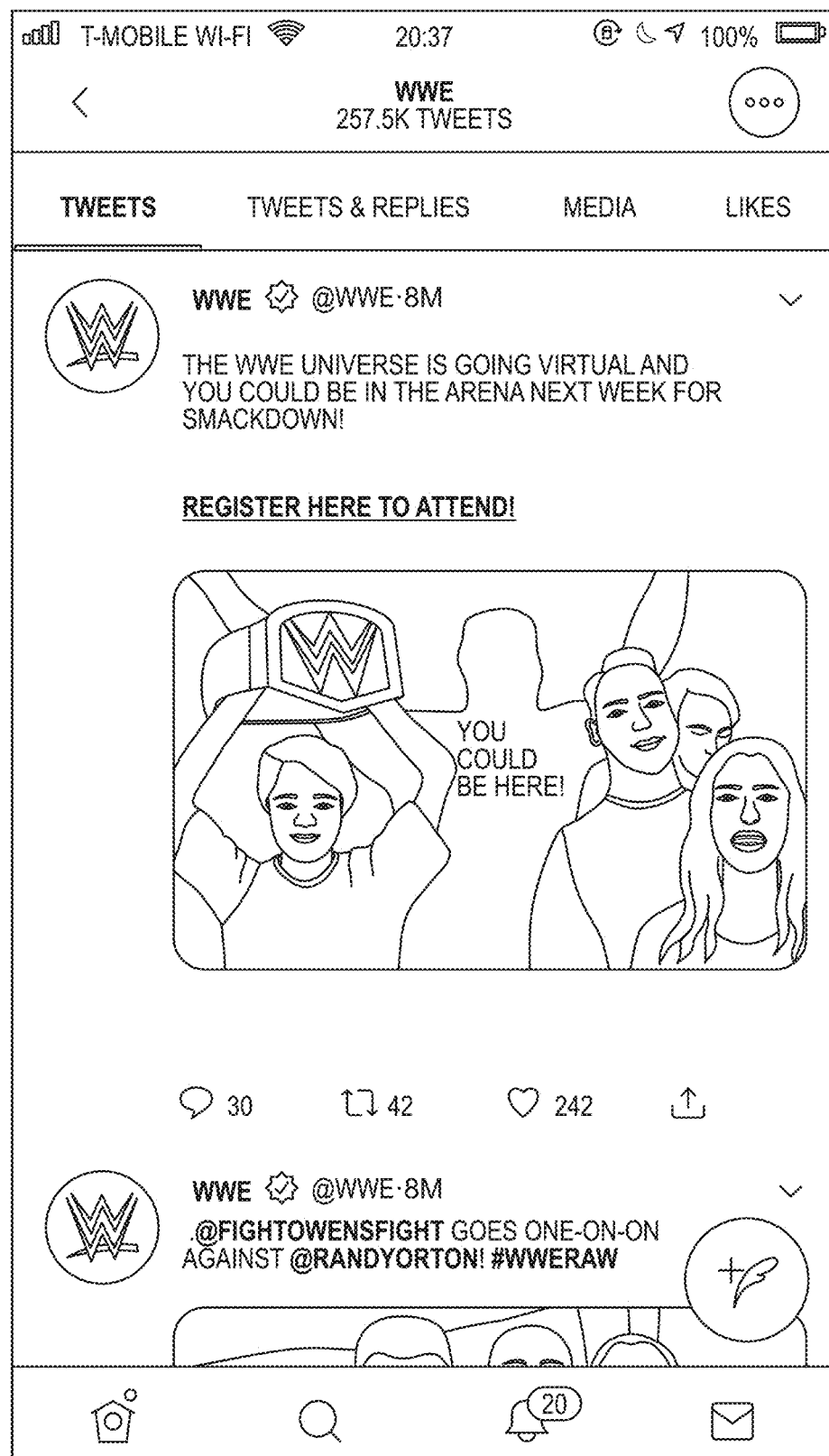
FIG. 14 depicts an example user interface for a social media post containing a link for accessing a registration form for a virtual seat at a live event.

FIG. 14 depicts an example user interface for a social media post containing a link for accessing a registration form for a virtual seat at a live event.

FIG. 15 depicts an example user interface for a confirmation message after a successful registration for a virtual seat at a live event.

Figure 16A:
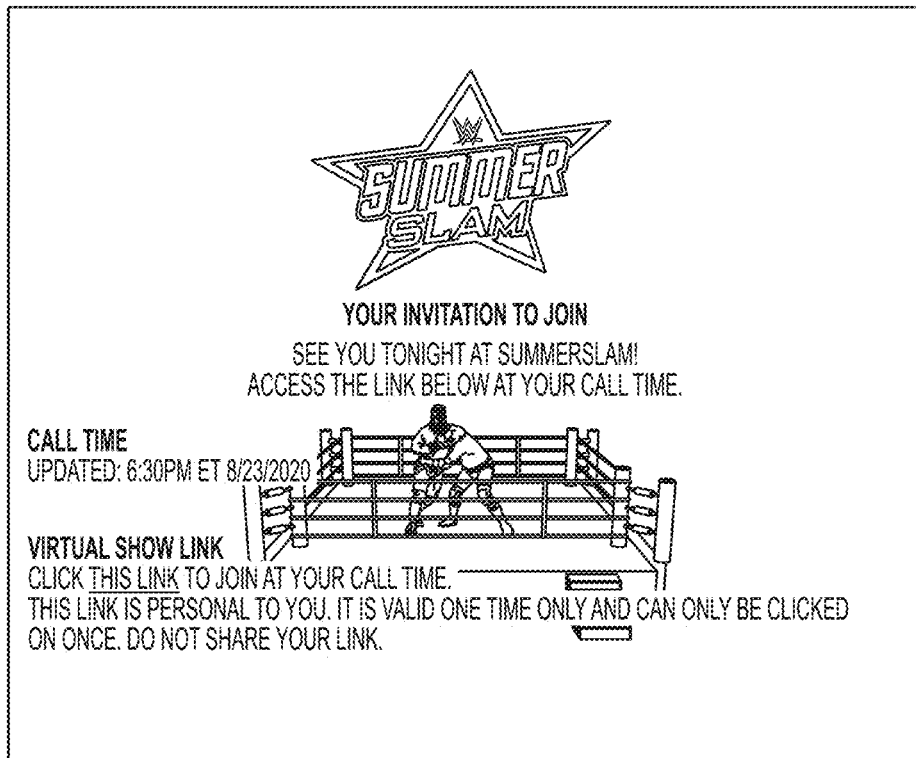
FIG. 16A depicts an example user interface for an invitation to join a virtual event by clicking a virtual show link at a particular call time.

FIG. 16A depicts an example user interface for an invitation to join a virtual event by clicking a virtual show link at a particular call time.

Figure 16B:
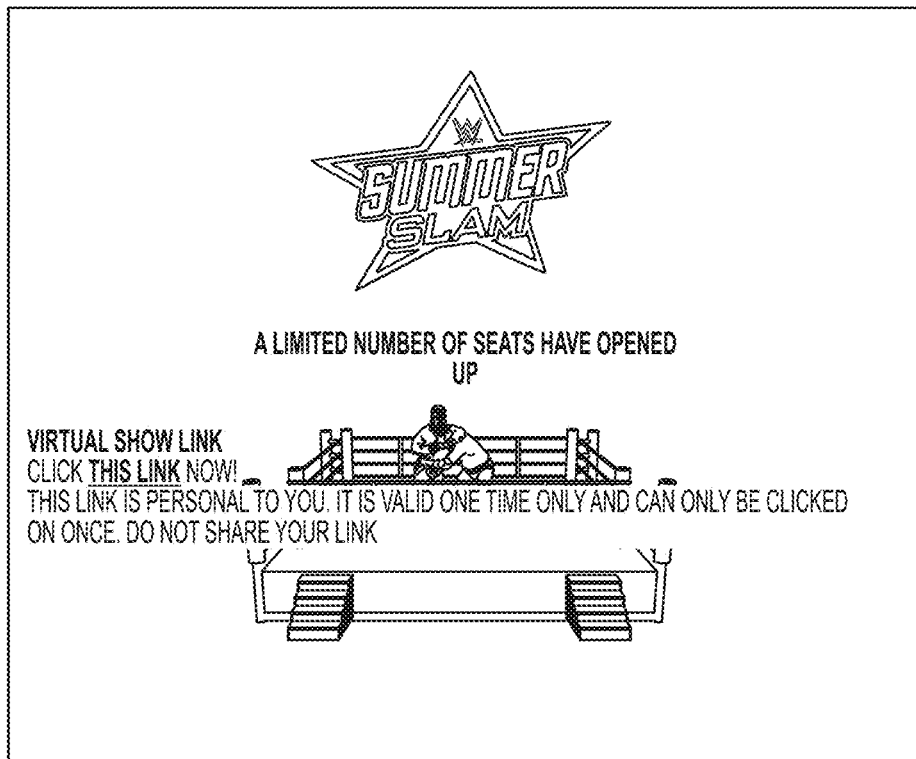
FIG. 16B depicts an example user interface for an invitation to join a virtual event for which some virtual seats have opened up for a user after the user was placed on standby.

FIG. 16B depicts an example user interface for an invitation to join a virtual event for which some virtual seats have opened up for a user after the user was placed on standby.

FIG. 17 depicts an example user interface for connecting to a live event platform to obtain a virtual seat for a live event.

FIGS. 18A-18G depict example user interface screens for configuring a user device to connect to the live event platform and for taking a virtual seat to participate in a live event.

Figure 19A:
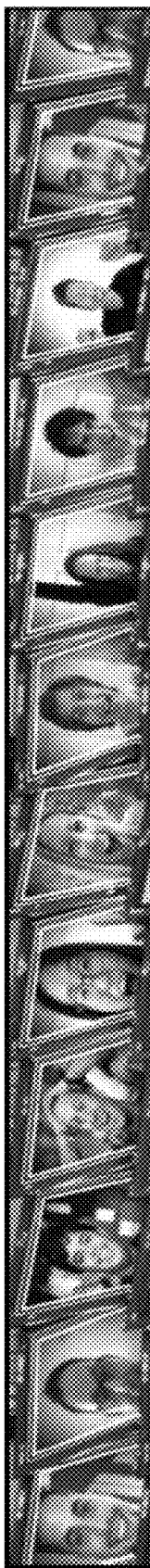
FIGS. 19A-19C depict an interactive mode that may be applied to the virtual fan seating in real time.
Figure 19B:
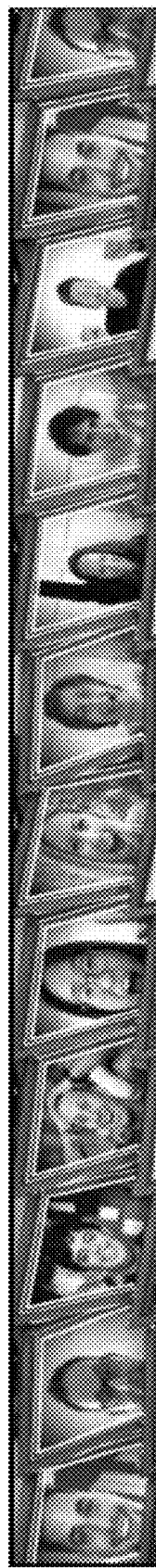
Figure 19C:

FIGS. 19A-19C depict an interactive mode that may be applied to the virtual fan seating are in real time (e.g., through activation of a user interface control on an administrative console in the master control room). Here, the virtual fan seats are placed into parallelograms on the one or more display screens in the venue. Each row of virtual seats may slightly overlap with the row of seats above and below. Additionally, a color theme may be applied in real time (e.g., through activation of a user interface control on an administrative console or automatically, via application of a machine-learned algorithm, in response to a detection of a corresponding thematic element in a video feed of the broadcasting that is captured during the live event). Here, FIG. 19A shows the parallelogram mode with blue outlining. FIG. 19B shows the parallelogram with red outlining, and FIG. 19C shows the parallelogram mode in yellow outlining and with a lower row having alternating yellow and blue outlining. In example embodiments, any of a number of possible effects may also be applied to individual seats or to a group of seats, as discussed above, such as a floating effect, a spinning effect, and so on. In example embodiments, the images may scroll to the right, left, up, or down. In example embodiments, the color outlining in real time. As changes to the visual representations of the virtual seats are detected, one or more transitioning effects may be applied (e.g., to make the changes more smooth).

Figure 20A:
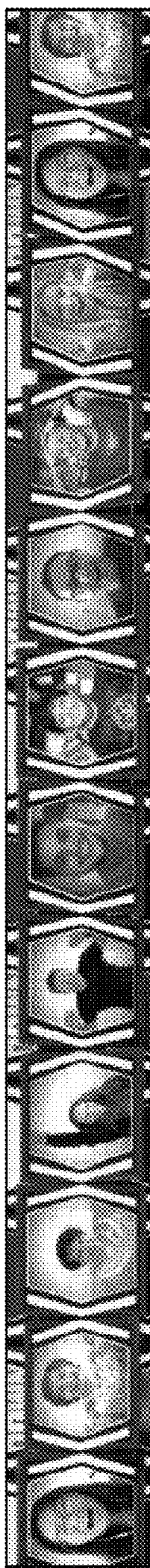
FIGS. 20A-20C depict an additional interactive mode, similar to the interactive mode of FIGS. 19A-19C, that may be applied to the virtual fan seating in real-time.
Figure 20B:
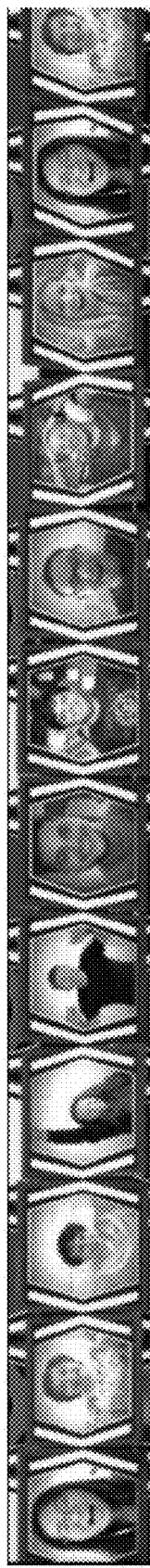
Figure 20C:
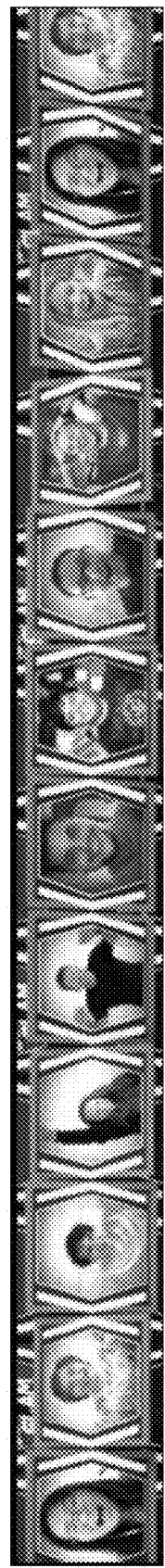

FIGS. 20A-20C depict an additional interactive mode, similar to the interactive mode of FIGS. 19A-19C, that may be applied to the virtual fan seating area in real-time. Here, the virtual fan seats are laid out on one more "belts." Each belt includes spaces for multiple virtual fan seats. FIG. 20A shows the belt mode with blue color scheme applied, FIG. 20B shows the belt mode with a red color scheme applied, and FIG. 20C shows the belt mode with a yellow color scheme applied.

Figure 21A:
FIGS. 21A-21C depict an additional interactive mode, similar to the interactive mode of FIGS. 19A-19C and 20A-20C, that may be applied to the virtual fan seating in real-time.
Figure 21B:
Figure 21C:

FIGS. 21A-21C depict an additional interactive mode, similar to the interactive mode of FIGS. 19A-19C and 20A-20C, that may be applied to the virtual fan seating area in real-time. Here, the virtual fan seats are laid out on one diamond-shaped spaces. FIG. 21A shows the belt mode with blue color scheme applied, FIG. 21B shows the belt mode with a red color scheme applied, and FIG. 21C shows the belt mode with a yellow and blue color scheme applied.

As can be seen from FIGS. 19A-19C, 20A-20C, and 21A-21C, many possibilities exist for additional modes, including use of different shapes for the virtual fan seats (e.g., hexagons, triangles, rectangles, and so on), different orientations of the virtual seats (e.g., rotating each virtual seat at a 45 degree angle), different spacing between the virtual seats, different sizing of the virtual seats, and so on.

Additionally, some of the spaces within the virtual seating area may be used for advertising or branding instead of a live virtual fan feed or simply used for one or more graphics having aesthetic or thematic design relating to the live event. The advertising for each space may be controlled (e.g., from one or more administrative consoles in the control room) and updated in real-time, just as with the video feeds corresponding to the virtual fan seating.

Figure 22:
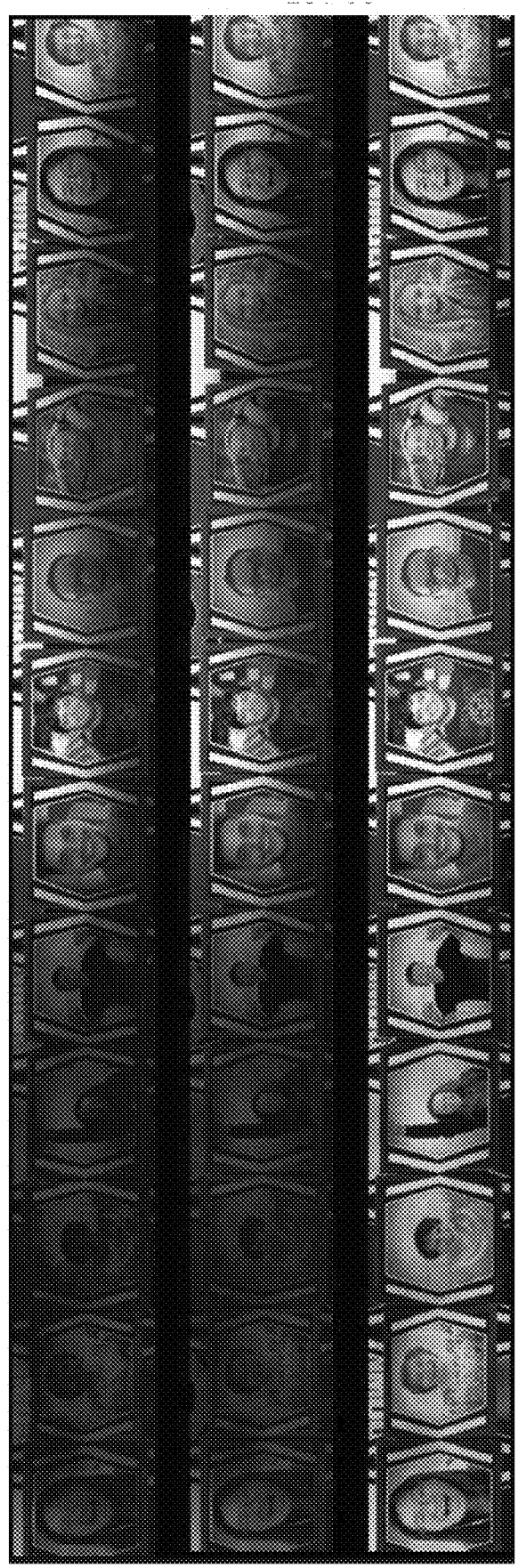
FIG. 22 depicts an example animation effect—color wash.

FIG. 22 depicts an example animation effect—color wash. Here, a color wash is applied to the virtual fan seating in real time. The color wash may be animated such that the colors appear splash across the virtual fan seats.

Figure 23:
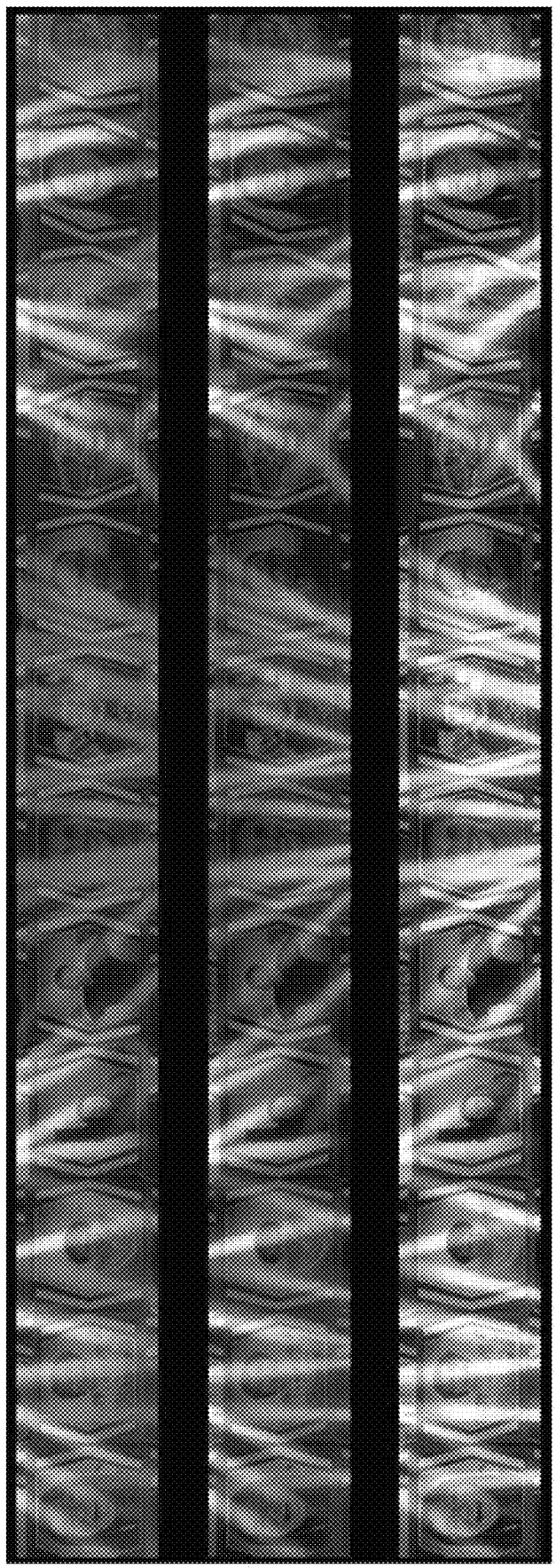
FIG. 23 depicts an additional example animation effect—spotlights.

FIG. 23 depicts an additional example animation effect— spotlights. Here, a "ballyhoo" animation is applied to the virtual fan seating in real time. The pictured spot lights may be animated in real-time to move across the virtual fan seats. Additionally, the colors of the spot lights may change.

Figure 24:
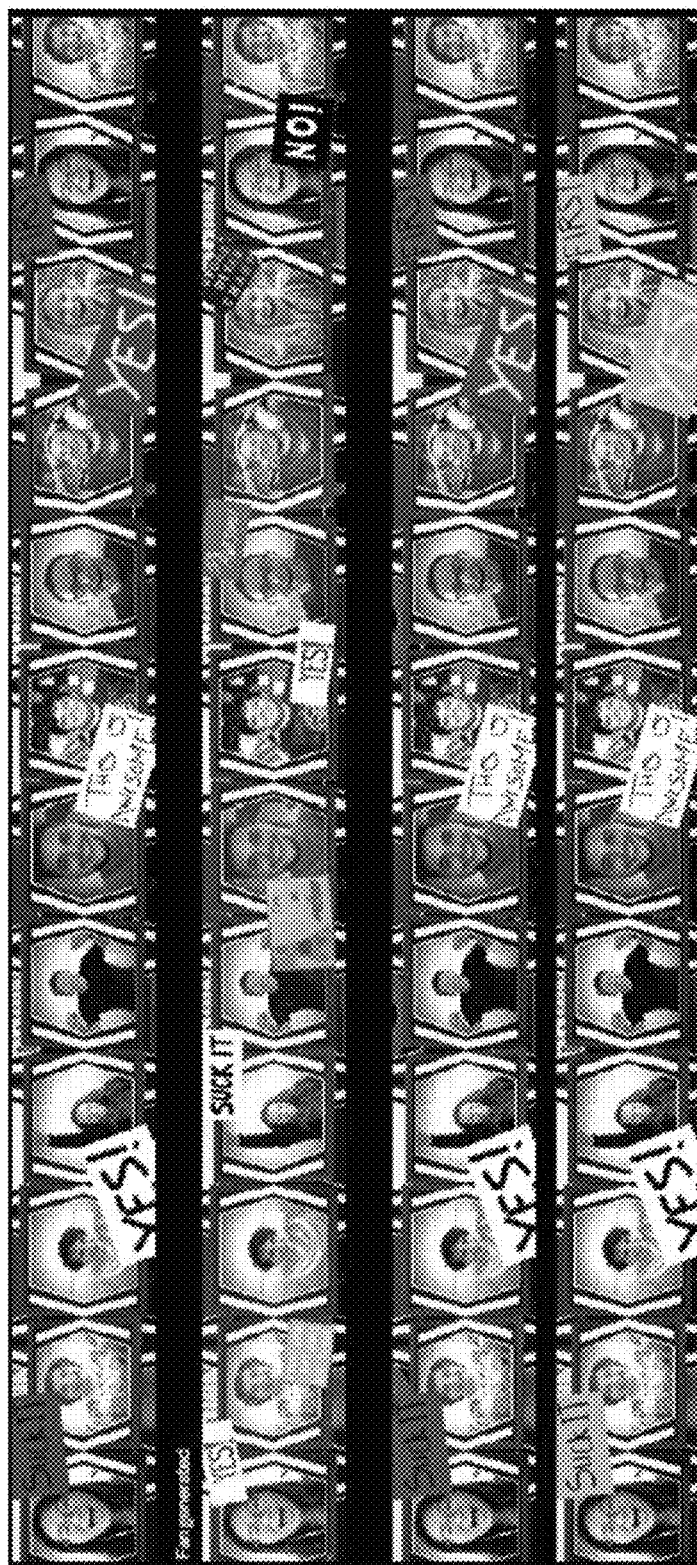
FIG. 24 depicts an additional example animation effect—signs.

FIG. 24 depicts an additional example animation effect— signs. Here, signs may be displayed in conjunction with some of the virtual fan seats. In example embodiments, each virtual fan may control whether a sign is displayed next to their seat. In example embodiments, at least some virtual fans may control the content of their signs. In other embodiments, the signs may be automatically generated, designed by a sponsor, or designed by an administrator or producer of the event. In example embodiments, the ability to display a custom sign may be offered only to virtual fans who have purchased or designated to receive a corresponding VIP experience.

Figure 25:
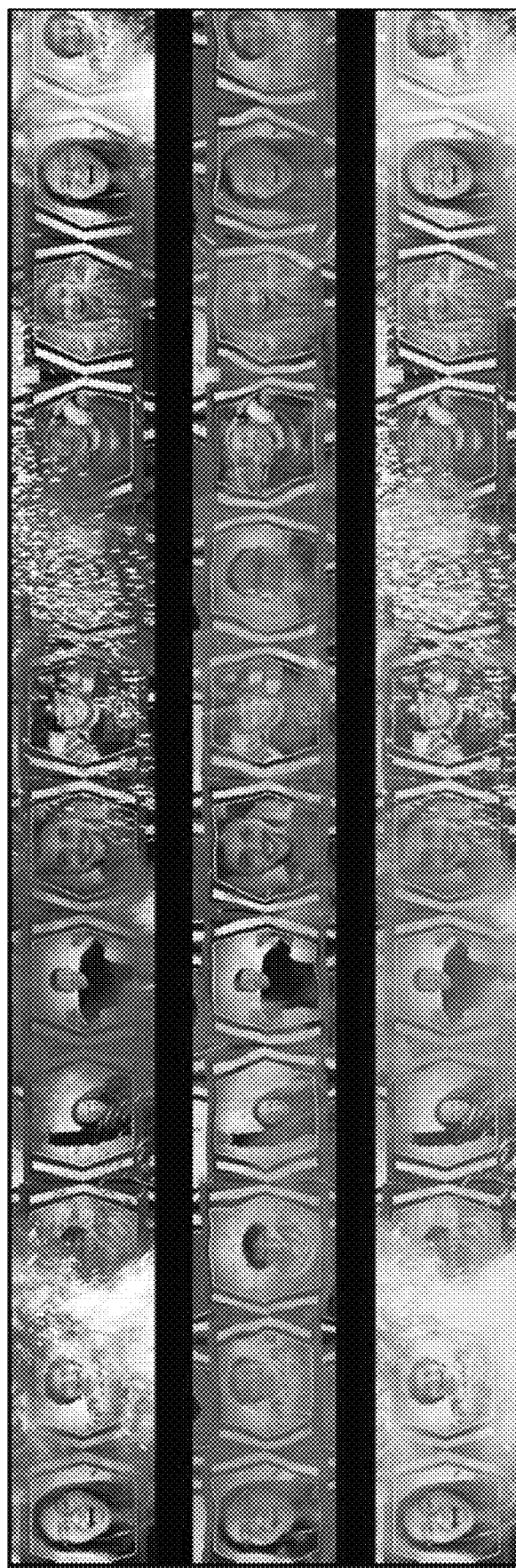
FIG. 25 depicts an additional example animation effect—fireworks.

FIG. 25 depicts an additional example animation effect— fireworks. Here, sparklers, smoke, and other firework-like effects are displayed over the fan seats. In example embodiments, the effect is coordinated with action occurring in the venue during the live event, such as a wrestler being declared the winner of a bout, a point being scored, and so on.

Figure 26:
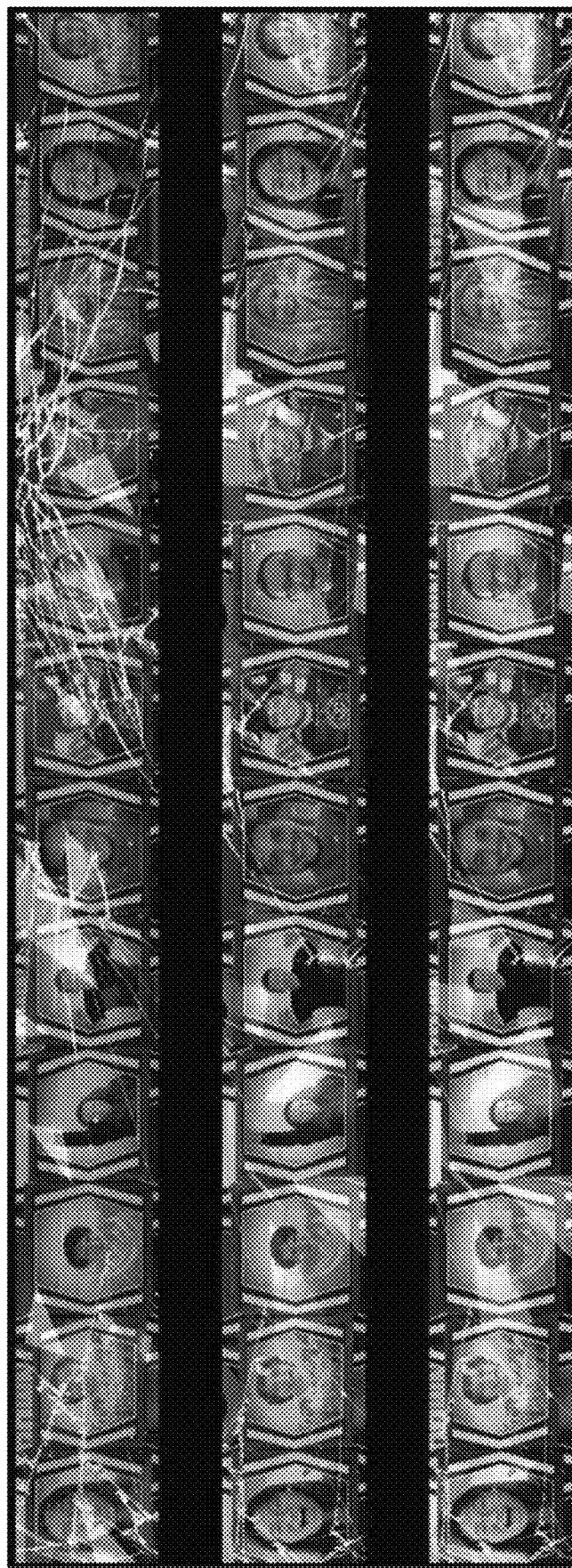
FIG. 26 depicts an additional example animation effect—shattering glass.

FIG. 26 depicts an additional example animation effect— shattering glass. Here, a shattering glass effect is displayed over the virtual fan seating. In example embodiments, the effect is coordinated with action occurring in the venue during the live event, such as a big hit being made in a football game.

The methods and the example embodiments disclosed herein may be implemented by one or more specially-configured computer systems. The one or more computer systems may be specially configured by, for example, the addition of one or more modules (e.g., hardware modules or software modules), such as software modules having specialized instructions that are implemented by one or more computer processors of the one or more computer systems. These methods or operations and the example embodiments may be embodied as instructions stored on a machine-readable medium that, when executed by one or more processors of a computer system, cause the computer system to perform one or more of the operations, including one or more non-routine or unconventional operations, or combinations or operations, as described herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In example embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 102) and via one or more appropriate interfaces (e.g., APIs).

Example embodiments may be implemented in digital electronic circuitry, or in computer hardware, firmware, or software, or in combinations of them. Example embodiments may be implemented using a computer program product (e.g., a computer program tangibly embodied in an information carrier, in a machine-readable medium for execution by, or to control the operation of, data processing apparatus, such as a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Figure 27:
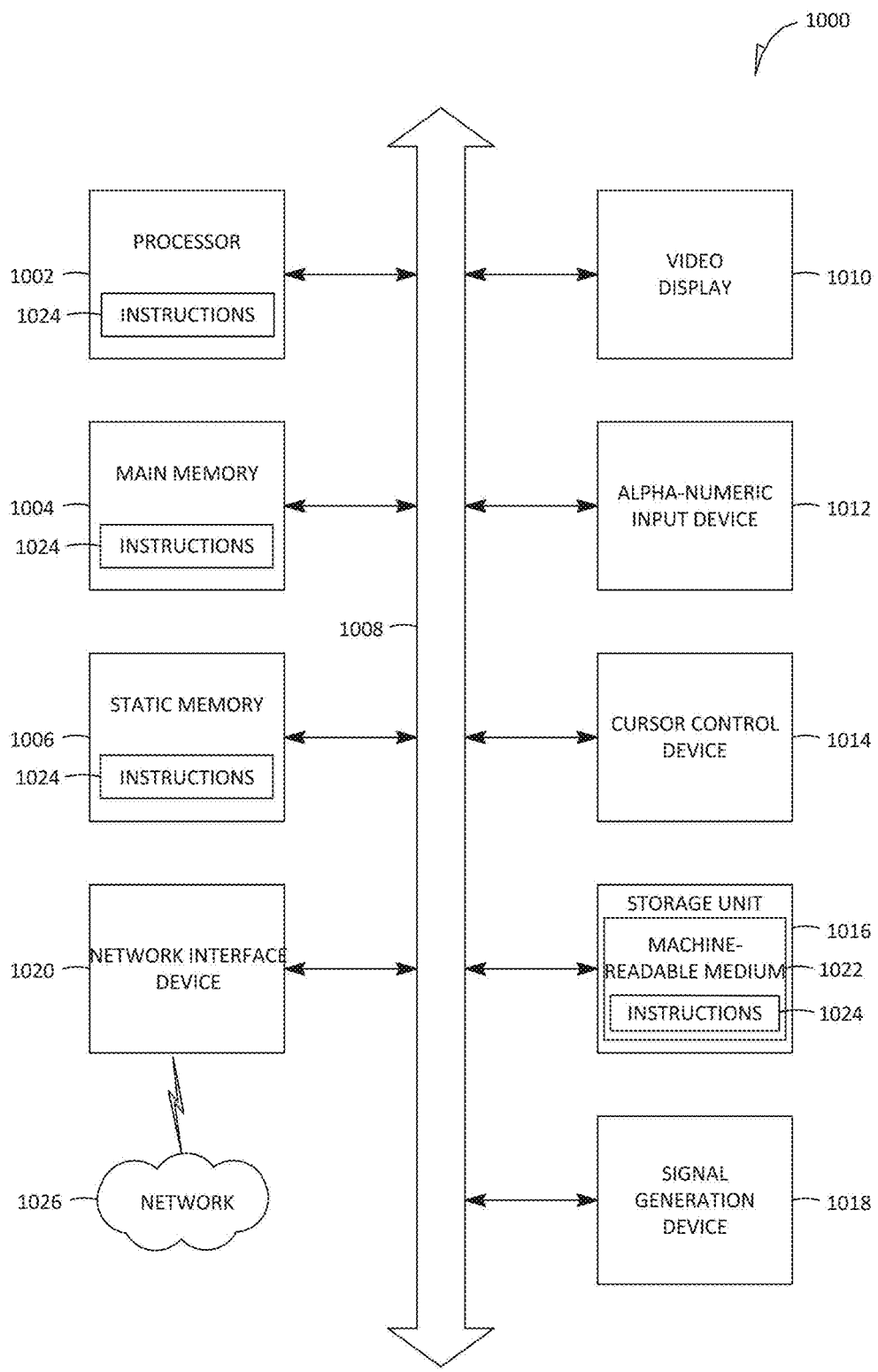
FIG. 27 is a block diagram of a machine in the example form of a computer system within which instructions for causing the machine to perform any one or more of the operations or methodologies discussed herein may be executed.

FIG. 27 is a block diagram of machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a mobile phone (e.g., an iPhone or a mobile phone executing an Android operating system), a web appliance, a network router, a network switch or a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a storage unit 1016 (e.g., a disk drive unit), a signal generation device 1018 (e.g., a speaker), and a network interface device 1020.

The storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding, or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1024 may further be transmitted or received over a communications network 1026 using a transmission medium. The instructions 1024 may be transmitted using the network interface device 1020 and any one of a number of well-known transfer protocols (e.g., hypertext transfer protocol (HTTP)). Examples of communication networks include LANs, WANs, the Internet, mobile telephone networks, plain olde telephone service (POTS) networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1026 may be one of the networks 102.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of example embodiments. Combinations of the above embodiments, and other embodiments not specifically described herein, will be apparent to those of skill in the art upon reviewing the above description.

What is claimed is:

1. A system comprising:
   one or more computer processors;
   one or more computer memories;
   one or more modules incorporated into the one or more computer memories, the one or more modules configuring the one or more computer processors to perform operations for providing a user interface on a client device of a user, the operations comprising:
   based on a receiving of a notification from a live event broadcasting platform that the user has successfully registered to attend a live event, communicating a live video feed of the user to the live event broadcasting platform, the video feed captured by a video camera connected to the client device of the user;
   based on a receiving of a notification from the live event broadcasting platform that the live video feed of the user has been selected for integration into a virtual seat comprising one or more display screens in a venue of the live event during a broadcasting of the live event, causing a notification to be presented in real time in the user interface, the notification notifying the user of the selection of the live video feed of the user;
   performing the integration of the live video feed of the user into the virtual seat, the performing of the integration including determining a prominence of the virtual seat relative to other virtual seats comprising one or more additional displays in the venue of the live event, the determining of the prominence based on one or more policies; and
   based on a notification from the live event broadcasting platform that the live video feed of the user has been integrated into the broadcasting of the live event, causing the user interface to be updated in real time to reflect the integrating of the live video feed of the user into the broadcasting of the live event.

2. The system of claim 1, wherein the causing of the user interface to be updated in real time to reflect the integrating includes indicating a location within the venue at which the live video feed of the user has been integrated into the broadcasting of the live event in relation to locations within the venue at which other live video feeds of other users have been integrated into the broadcasting of the live event.

3. The system of claim 1, wherein the user interface further includes a lobby area, the lobby area being configured to present information pertaining to one or more additional users that have successfully registered to attend the live event, and wherein the operations further comprise, based on a notification from the live event broadcasting platform that a live video feed of one of the one or more additional users has been integrated into the broadcasting of the live event, causing the user interface to be updated in real time to reflect the integrating of the live video feed of the one of the one or more additional users.

4. The system of claim 1, the operations further comprising:
   based on a receiving of a notification from the live event platform that the live video feed of the user is being featured in the broadcasting of the live event, causing the user interface to be updated in real time to reflect the featuring of the user in the broadcasting of the live event.

5. The system of claim 1, the operations further comprising:
   based on a receiving of a notification from the live event broadcast platform that the live video feed of the user has been soft-kicked or hard-kicked from the broadcasting, causing the user interface to be updated to reflect the soft-kicking or the hard-kicking, the updating including providing an indication of a reason for the soft-kicking or the hard-kicking.

6. The system of claim 1, the operations further comprising:
   based on a receiving of a notification from the live event broadcast platform that the live video feed of the user has been moved to a new location within the broadcasting, causing the user interface to be updated to reflect the moving, the notifying updating including providing an indication of the new location.

7. The system of claim 3, wherein the lobby area is configurable by the user to restrict access to the lobby area to one or more friends of the user who have successfully registered for the live event.

8. A method comprising:
performing operations, using one or more computer processors, for providing a user interface on a client device of a user, the operations comprising:
based on a receiving of a notification from a live event broadcasting platform that the user has successfully registered to attend a live event, communicating a live video feed of the user to the live event broadcasting platform, the video feed captured by a video camera connected to the client device of the user;
based on a receiving of a notification from the live event broadcasting platform that the live video feed of the user has been selected for integration into a virtual seat comprising one or more display screens in a venue of the live event during a broadcasting of the live event, causing a notification to be presented in real time in the user interface, the notification notifying the user of the selection of the live video feed of the user;
performing the integration of the live video feed of the user into the virtual seat, the performing of the integration including determining a prominence of the virtual seat relative to other virtual seats comprising one or more additional displays in the venue of the live event, the determining of the prominence based on one or more policies; and
based on a notification from the live event broadcasting platform that the live video feed of the user has been integrated into the broadcasting of the live event, causing the user interface to be updated in real time to reflect the integrating of the live video feed of the user into the broadcasting of the live event.

9. The method of claim 8, wherein the causing of the user interface to be updated in real time to reflect the integrating includes indicating a location at which the live video feed of the user has been integrated into the broadcasting of the live event in relation to locations at which other live video feeds of other users have been integrated into the broadcasting of the live event.

10. The method of claim 8, wherein the user interface further includes a lobby area, the lobby area being configured to present information pertaining to one or more additional users that have successfully registered to attend the live event, and wherein the operations further comprise, based on a notification from the live event broadcasting platform that a live video feed of one of the one or more additional users has been integrated into the broadcasting of the live event, causing the user interface to be updated in real time to reflect the integrating of the live video feed of the one of the one or more additional users.

11. The method of claim 8, the operations further comprising:
based on a receiving of a notification from the live event platform that the live video feed of the user is being featured in the broadcasting of the live event, causing the user interface to be updated in real time to reflect the featuring of the user in the broadcasting of the live event.

12. The method of claim 8, the operations further comprising:
based on a receiving of a notification from the live event broadcast platform that the live video feed of the user has been soft-kicked or hard-kicked from the broadcasting, causing the user interface to be updated to reflect the soft-kicking or the hard-kicking, the updating including providing an indication of a reason for the soft-kicking or the hard-kicking.

13. The method of claim 8, the operations further comprising:
based on a receiving of a notification from the live event broadcast platform that the live video feed of the user has been moved to a new location within the broadcasting, causing the user interface to be updated to reflect the moving, the notifying updating including providing an indication of the new location.

14. The method of claim 11, wherein the lobby area is configurable by the user to restrict access to the lobby area to one or more friends of the user who have successfully registered for the live event.

15. A non-transitory computer-readable medium including a set of instructions that, when executed by one or more computer processors, causes the one or more computer processors to perform operations for providing a user interface on a client device of a user, the operations comprising:
based on a receiving of a notification from a live event broadcasting platform that the user has successfully registered to attend a live event, communicating a live video feed of the user to the live event broadcasting platform, the video feed captured by a video camera connected to the client device of the user;
based on a receiving of a notification from the live event broadcasting platform that the live video feed of the user has been selected for integration into a virtual seat comprising one or more display screens in a venue of the live event during a broadcasting of the live event, causing a notification to be presented in real time in the user interface, the notification notifying the user of the selection of the live video feed of the user;
performing the integration of the live video feed of the user into the virtual seat, the performing of the integration including determining a prominence of the virtual seat relative to other virtual seats comprising one or more additional displays in the venue of the live event, the determining of the prominence based on one or more policies; and
based on a notification from the live event broadcasting platform that the live video feed of the user has been integrated into the broadcasting of the live event, causing the user interface to be updated in real time to reflect the integrating of the live video feed of the user into the broadcasting of the live event.

16. The non-transitory computer-readable medium of claim 15, wherein the causing of the user interface to be updated in real time to reflect the integrating includes indicating a location at which the live video feed of the user has been integrated into the broadcasting of the live event in relation to locations at which other live video feeds of other users have been integrated into the broadcasting of the live event.

17. The non-transitory computer-readable medium of claim 15, wherein the user interface further includes a lobby area, the lobby area being configured to present information pertaining to one or more additional users that have successfully registered to attend the live event, and wherein the operations further comprise, based on a notification from the live event broadcasting platform that a live video feed of one of the one or more additional users has been integrated into the broadcasting of the live event, causing the user interface to be updated in real time to reflect the integrating of the live video feed of the one of the one or more additional users.

18. The non-transitory computer-readable medium of claim 15, the operations further comprising:
based on a receiving of a notification from the live event platform that the live video feed of the user is being featured in the broadcasting of the live event, causing the user interface to be updated in real time to reflect the featuring of the user in the broadcasting of the live event.

19. The non-transitory computer-readable medium of claim 15, the operations further comprising:
based on a receiving of a notification from the live event broadcast platform that the live video feed of the user has been soft-kicked or hard-kicked from the broadcasting, causing the user interface to be updated to reflect the soft-kicking or the hard-kicking, the updating including providing an indication of a reason for the soft-kicking or the hard-kicking.

20. The non-transitory computer-readable medium of claim 15, the operations further comprising:
based on a receiving of a notification from the live event broadcast platform that the live video feed of the user has been moved to a new location within the broadcasting, causing the user interface to be updated to reflect the moving, the notifying updating including providing an indication of the new location.

* * * * *